(12) United States Patent
Maeda et al.

(10) Patent No.: US 9,340,693 B2
(45) Date of Patent: May 17, 2016

(54) ACTINIC RAY CURABLE INKJET INK AND IMAGE RECORDING METHOD USING SAME

(75) Inventors: Akio Maeda, Tokyo (JP); Satoshi Mori, Tokyo (JP); Masashi Ikeda, Tokyo (JP); Toshiyuki Takabayashi, Tokyo (JP); Takashi Iwata, Saitama (JP); Hirotaka Iijima, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/004,729

(22) PCT Filed: Mar. 27, 2012

(86) PCT No.: PCT/JP2012/002110
§ 371 (c)(1),
(2), (4) Date: Sep. 12, 2013

(87) PCT Pub. No.: WO2012/132406
PCT Pub. Date: Oct. 4, 2012

(65) Prior Publication Data
US 2014/0002534 A1    Jan. 2, 2014

(30) Foreign Application Priority Data
Mar. 28, 2011  (JP) .................................. 2011-070051

(51) Int. Cl.
*B41J 2/01*   (2006.01)
*C09D 11/38*  (2014.01)
(Continued)

(52) U.S. Cl.
CPC ............. *C09D 11/38* (2013.01); *B41J 11/0015* (2013.01); *C09D 11/101* (2013.01); *C09D 11/12* (2013.01); *B41M 7/0081* (2013.01)

(58) Field of Classification Search
CPC ............. B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00
USPC ........... 347/100, 95, 96, 88, 99, 102, 101, 20, 347/21; 106/31.6, 31.27, 31.13; 523/160, 523/161
See application file for complete search history.

(56) References Cited

U.S. PATENT DOCUMENTS 4,659,383 A * 4/1987 Lin et al. ......................... 347/99
5,922,114 A * 7/1999 Sawada ....................... 106/31.29
(Continued)

FOREIGN PATENT DOCUMENTS

JP   10-316913   12/1998
JP   10-316914   12/1998
(Continued)

OTHER PUBLICATIONS

Extended European Search Report.

*Primary Examiner* — Manish S Shah
(74) *Attorney, Agent, or Firm* — Lucas & Mercanti, LLP

(57) ABSTRACT

The purpose of the present invention is to provide an actinic ray curable inkjet ink which, in an inkjet printing method, is capable of having both high pinning characteristics and high ejection characteristics. In order to achieve the above purpose, this actinic ray curable inkjet ink includes an actinic ray curable compound, ketone wax, and ester wax, and reversibly goes through a sol-gel phase transition depending on the temperature.

25 Claims, 2 Drawing Sheets

(51) Int. Cl.
  *C09D 11/101* (2014.01)
  *B41J 11/00* (2006.01)
  *C09D 11/12* (2006.01)
  *B41M 7/00* (2006.01)

(56) References Cited

U.S. PATENT DOCUMENTS

| | | | |
|---|---|---|---|
| 5,980,621 A | 11/1999 | Inaishi et al. | |
| 6,336,720 B1 * | 1/2002 | Suzuki et al. | 347/88 |
| 2005/0165152 A1 * | 7/2005 | Barr et al. | 524/487 |
| 2005/0277043 A1 * | 12/2005 | Tanma et al. | 430/109.3 |
| 2006/0159850 A1 | 7/2006 | Breton et al. | |
| 2007/0058020 A1 | 3/2007 | Wetjens et al. | |
| 2007/0150925 A1 * | 6/2007 | Fujishiro | 725/93 |
| 2009/0033730 A1 * | 2/2009 | Shino et al. | 347/102 |
| 2010/0118095 A1 * | 5/2010 | Nakamura | 347/102 |
| 2011/0148979 A1 * | 6/2011 | Breton et al. | 347/20 |
| 2012/0013690 A1 * | 1/2012 | Breton et al. | 347/100 |
| 2012/0154479 A1 * | 6/2012 | Wu et al. | 347/20 |

FOREIGN PATENT DOCUMENTS

| | | | | |
|---|---|---|---|---|
| JP | 2000-044857 | | 2/2000 | |
| JP | 2002-138228 | | 5/2002 | |
| JP | 2002138228 A | * | 5/2002 | B41J 2/01 |
| JP | 2006-193745 | | 7/2006 | |
| JP | 2007-246820 | | 9/2007 | |
| JP | 2011-057900 | | 3/2011 | |
| WO | 2007/025893 | | 3/2007 | |

* cited by examiner

ACTINIC RAY CURABLE INKJET INK AND IMAGE RECORDING METHOD USING SAME

CROSS-REFERENCE TO RELATED APPLICATIONS

This application is a 371 of PCT/JP2012/002110 filed on Mar. 27, 2012, which claims the priority of Japanese Application Serial No. 2011-070051 filed on Mar. 28, 2011, the contents of each of which are incorporated herein by reference.

TECHNICAL FIELD

The present invention relates to an actinic ray curable inkjet ink and an image recording method using the same.

BACKGROUND ART

Inkjet printing techniques have been used in various fields of printing since images can be formed easily at low costs. One of the inkjet printing techniques is ultraviolet-curable inkjet printing wherein droplets of ultraviolet-curable ink are landed onto a recording medium and cured by irradiation with ultraviolet radiation to form thereon an image. Recently, ultraviolet-curable inkjet printing has been attracting attention for its ability to form images that exhibit high rub resistance and high adhesion even on recording media which lack ink absorption ability.

Further, studies have been made to realize high-speed printing for ultraviolet-curable inkjet printing, e.g., by using single-pass printing or high-speed serial printing with a small number of passes. High-speed printing, however, suffers from the drawback that the distance between adjacent ink droplets (dots) becomes small, so that adjacent dots are prone to be merged resulting in image quality reduction. In order to prevent merging of adjacent dots, studies have been made to increase the pinning property of ultraviolet-curable inkjet inks.

One of the methods that have been studied to increase the pinning property of ultraviolet-curable inkjet ink is to add a gelling agent so that the ink undergoes sol-gel phase transition depending on temperature. That is, it has been considered to prevent merging of dots by cooling the ink droplets for gelation as soon as they have been discharged in liquid state at high temperatures and landed on a recording medium. As the gelling agents to be added to the ink, stearone and the like have been disclosed (see, e.g., Patent Literatures 1 and 2).

CITATION LIST

Patent Literature

PTL 1: US Patent Application Publication No. 2007/0058020
PTL 2: WO2007/025893

SUMMARY OF INVENTION

Technical Problem

However, since the gelling agents disclosed in Patent Literatures 1 and 2 have low solubility to the curable compounds and the like contained in the ink, the ink has a drawback of exhibiting low ejectability even when it has high temperature. Specifically, there have been cases in which ink clogs the nozzles and/or deposits of the gelling agent adhere to the tip of the nozzles, so that straight ink ejection may be impaired.

The present invention has been achieved in view of such circumstances pertinent in the art, and it is an object of the invention to provide an actinic ray curable inkjet ink capable of achieving a balance between high pinning property and high ejectability.

Solution to Problem

The inventors found that in order to enhance the ink's pinning property, it is preferable to increase the sol-gel phase transition rate, and also found that as a gelling agent capable of realizing the increased gel phase transition rate, a "particular ketone compound" is preferred. On the other hand, an ink containing as the gelling agent the "particular ketone compound" alone has a drawback of exhibiting poor ejectability as described above. The inventors conducted extensive studies and found that an ink containing the "particular ketone compound" and a "particular ester compound" as gelling agents can enhance ink ejectability while maintaining high pinning property that are comparable to those of inks containing the "particular ketone compound" alone. Furthermore, the inventors also found that an ink containing the "particular ketone compound" and "particular ester compound" exhibit higher pinning property with smaller amounts of gelling agent, in comparison with an ink containing the "particular ketone compound" alone. The present invention was achieved based on these findings.

That is, a first aspect of the present invention relates to the following actinic ray curable inkjet ink.

[1] An actinic ray curable inkjet ink including:
an actinic ray curable compound,
a ketone wax, and
an ester wax,
wherein the ink undergoes reversible sol-gel phase transition depending on temperature.

[2] The actinic ray curable inkjet ink according to [1], wherein a melting point of the ketone wax is higher than a melting point of the ester wax.

[3] The actinic ray curable inkjet ink according to [1] or [2], wherein a difference between the melting point of the ketone wax and the melting point of the ester wax is 10° C. or more.

[4] The actinic ray curable inkjet ink according to any one of [1] to [3], wherein the number of carbon atoms in a molecule that constitute the ketone wax and the number of carbon atoms in a molecule that constitute the ester wax are each 19 to less than 100.

[5] The actinic ray curable inkjet ink according to any one of [1] to [4], wherein the melting points of the ketone wax and the ester wax are each 30° C. to lower than 150° C.

[6] The actinic ray curable inkjet ink according to any one of [1] to [5], wherein the ketone wax is a compound A represented by the following General Formula 1:

$$R_1-(C=O)-R_2 \qquad (1)$$

where R1 and R2 each independently represent an aliphatic hydrocarbon group containing a straight chain moiety having 9 to 25 carbon atoms; and
the ester wax is a compound B represented by General Formula 2:

$$R_3-(C=O)-O-R_4 \qquad (2)$$

where R3 and R4 each independently represent an aliphatic hydrocarbon group containing a straight chain moiety having 9 to 26 carbon atoms.

[7] The actinic ray curable inkjet ink according to any one of [1] to [6], wherein a total amount of the ketone wax and the ester wax is 0.5% by mass to less than 10% by mass with respect to the actinic ray curable inkjet ink.

[8] The actinic ray curable inkjet ink according to any one of [1] to [6], wherein a total amount of the ketone wax and the ester wax is 1% by mass to less than 7% by mass with respect to the actinic ray curable inkjet ink.

[9] The actinic ray curable inkjet ink according to any one of [1] to [8], wherein the actinic ray curable compound is a (meth)acrylate compound.

[10] The actinic ray curable inkjet ink according to [9], wherein the (meth)acrylate compound is an ethylene oxide-modified (meth)acrylate compound.

[11] The actinic ray curable inkjet ink according to any one of [6] to [10], wherein in General Formula 1, R1 and R2 each represent an aliphatic hydrocarbon group containing a straight chain moiety having 11 to less than 23 carbon atoms.

[12] The actinic ray curable inkjet ink according to any one of [6] to [10], wherein in General Formula 1, R1 and R2 each represent a linear alkylene group 11 to less than 23 carbon atoms.

[13] The actinic ray curable inkjet ink according to any one of [6] to [12], wherein in General Formula 2, R3 represents an aliphatic hydrocarbon group containing a straight chain moiety having 11 to less than 23 carbon atoms, and R4 represents an aliphatic hydrocarbon group containing a straight chain moiety having 12 to less than 24 carbon atoms.

[14] The actinic ray curable inkjet ink according to any one of [6] to [12], wherein in General Formula 2, R3 represents a linear alkylene group having 11 to less than 23 carbon atoms, and R4 represents a linear alkylene group having 12 to less than 24 carbon atoms.

[15] The actinic ray curable inkjet ink according to any one of [1] to [14], wherein the ketone wax includes 18-pentatriacontanone.

[16] The actinic ray curable inkjet ink according to any one of [1] to [15], wherein the ink comprises two or more kinds of the ketone wax.

[17] The actinic ray curable inkjet ink according to any one of [1] to [16], wherein a viscosity of the ink as measured using a cone-plate type rheometer having a diameter of 75 mm and a cone angle of 1.0° at 80° C. and a shear rate of 11.7/s is 3 mPa·s to 20 mPa·s.

[18] The actinic ray curable inkjet ink according to any one of [1] to [17], wherein the viscosity measured using a cone-plate type rheometer having a diameter of 75 mm and a cone angle of 1.0° at 25° C. and a shear rate of 1.7/s is 1000 mPa·s or greater.

[19] The actinic ray curable inkjet ink according to any one of [1] to [18], wherein a gelling temperature of the ink is 40° C. to 70° C., the gelling temperature being a temperature at which a viscosity of the ink reaches 200 mPa·s when a temperature of the ink is lowered from 100° C. to 20° C. at a temperature decline rate of 0.1° C./s, the viscosity being measured at a shear rate of 11.7/s using a cone-plate type rheometer having a diameter of 75 mm and a cone angle of 1.0°.

A second aspect of the present invention relates to the following image recording method.

[20] An image recording method including:

discharging droplets of the actinic ray curable inkjet ink according to any one of [1] to [19] from a inkjet head, allowing the droplets to adhere onto a recording medium; and irradiating the droplets adhered onto the recording medium with an actinic ray to cure the ink.

[21] The image recording method according to [20], wherein a temperature of the ink inside the inkjet head is 10° C. to 30° C. higher than a gelling temperature of the ink, the gelling temperature being a temperature at which a viscosity of the ink reaches 200 mPa·s when a temperature of the ink is lowered from 100° C. to 20° C. at a temperature decline rate of 0.1° C./s, the viscosity being measured at a shear rate of 11.7/s using a cone-plate type rheometer having a diameter of 75 mm and a cone angle of 1.0°.

[22] The image recording method according to [20] or [21], wherein an image is recorded by means of single-pass printing.

Advantageous Effects of Invention

According to the present invention, an actinic ray curable inkjet ink capable of achieving high pinning property and high ejectability can be provided.

DESCRIPTION OF EMBODIMENTS

1. Actinic Ray Curable Inkjet Ink

Figure 1A:
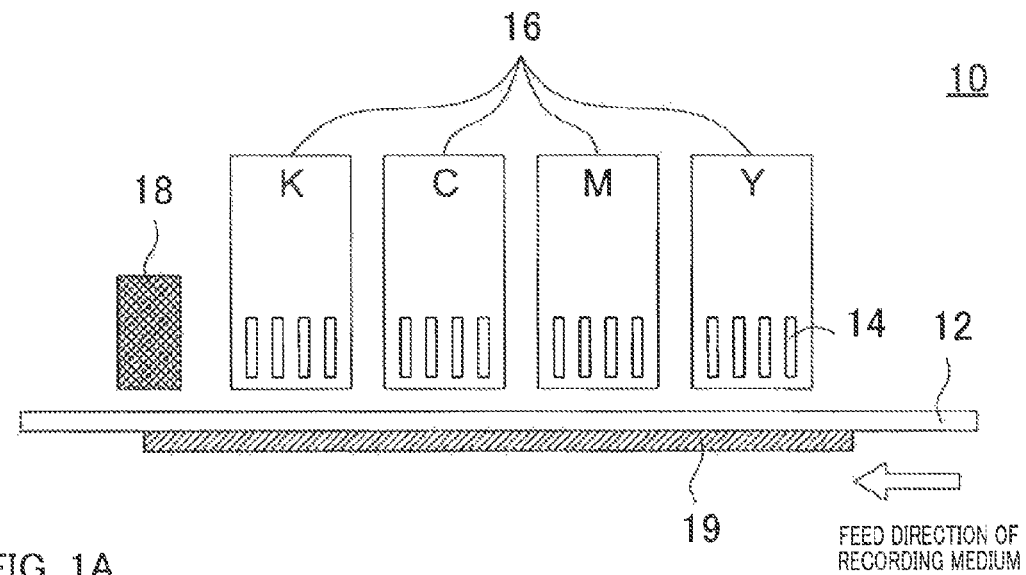
FIGS. 1A and 1B are diagrams illustrating an example of the configuration of the essential part of an inkjet printing apparatus employing line printing.

An actinic ray curable inkjet ink contains at least an actinic ray curable compound, a particular ketone compound A, and a particular ester compound B, and may further contain a photopolymerization initiator and the like as necessary.

Actinic Ray Curable Compound

The actinic ray curable compound is a photopolymerizable compound that is crosslinked or polymerized by irradiation with an actinic ray. Examples of the actinic ray include electron beams, ultraviolet radiation, α-radiation, γ-radiation, and X-radiation, with preferred examples being ultraviolet radiation and electron beams. The actinic ray curable compound is a radical polymerizable compound or a cationic polymerizable compound, and is preferably a radical polymerizable compound.

The radical polymerizable compound refers to a compound (a monomer, an oligomer, a polymer, or a mixture thereof) having a radical polymerizable ethylenically unsaturated bond. The radical polymerizable compound may be used singly or two or more kinds thereof may be used in combination.

Examples of the compound having a radical polymerizable ethylenically unsaturated bond include unsaturated carboxylic acids and salts thereof, unsaturated carboxylic acid ester compounds, unsaturated carboxylic acid urethane compounds, unsaturated carboxylic acid amide compounds and anhydrides thereof, acrylonitrile, styrene, unsaturated polyesters, unsaturated polyethers, unsaturated polyamides, and unsaturated urethanes. Examples of the unsaturated carboxylic acids include (meth)acrylic acid, itaconic acid, crotonic acid, isocrotonic acid, and maleic acid.

Among the foregoing, the radical polymerizable compound is preferably an unsaturated carboxylic acid ester compound, and is more preferably a (meth)acrylate compound. The (meth)acrylate compound may be not only the monomer that will be described later, but also an oligomer, a mixture of a monomer and an oligomer, a modification product, an oligomer having a polymerizable functional group, or the like.

Examples of the (meth)acrylate compound include monofunctional monomers such as isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl diglycol (meth)acrylate, 2-hydroxybutyl (meth)acrylate, 2-(meth)acryloyloxyethyl-hexahydrophthalic acid, butoxyethyl (meth)acrylate, ethoxydiethylene glycol (meth)acrylate, methoxydiethylene glycol (meth)acrylate, methoxypolyethylene glycol (meth)acrylate, methoxypropylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, 2-(meth)acryloyloxyethylsuccinic acid, 2-(meth)acryloyloxyethylphthalic acid, 2-(meth)acryloyloxyethyl-2-hydroxyethylphthalic acid, and t-butylcyclohexyl (meth)acrylate;

bifunctional monomers such as triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethyloltricyclodecane di(meth)acrylate, PO adduct di(meth)acrylate of bisphenol A, hydroxypivalic acid neopentyl glycol di(meth)acrylate, and polytetramethylene glycol di(meth)acrylate; and polyfunctional monomers of trifunctionality or higher functionality, such as trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerin propoxytri(meth)acrylate, and pentaerythritol ethoxytetra(meth)acrylate.

Among the foregoing, from the viewpoint of photosensitivity or the like, stearyl(meth)acrylate, lauryl(meth)acrylate, isostearyl(meth)acrylate, ethoxydiethylene glycol(meth)acrylate, isobornyl(meth)acrylate, tetraethylene glycol di(meth)acrylate, and glycerin propoxytri(meth)acrylate are preferred.

The (meth)acrylate compound may be a modification product, and examples thereof include ethylene oxide-modified (meth)acrylate compounds such as ethylene oxide-modified trimethylolpropane tri(meth)acrylate and ethylene oxide-modified pentaerythritol tetraacrylate; caprolactone-modified (meth)acrylate compounds such as caprolactone-modified trimethylolpropane tri(meth)acrylate; and caprolactam-modified (meth)acrylate compounds such as caprolactam-modified dipentaerythritol hexa(meth)acrylate. Among the foregoing, from the viewpoint that photosensitivity is high and the card-house structure that will be described below is likely to be formed upon gelling at a low temperature, an ethylene oxide-modified (meth)acrylate compound is preferred. Furthermore, an ethylene oxide-modified (meth)acrylate compound easily dissolves in other ink components at a high temperature and undergoes less curing shrinkage, so that curling of the printed matter does not easily occur.

Examples of the ethylene oxide-modified (meth)acrylate compound include 4EO-modified hexanediol diacrylate CD561 (molecular weight: 358), 3EO-modified trimethylolpropane triacrylate SR454 (molecular weight: 429), 6EO-modified trimethylolpropane triacrylate SR499 (molecular weight: 560), and 4EO-modified pentaerythritol tetraacrylate SR494 (molecular weight: 528) manufactured by Sartomer Company, Inc.; polyethylene glycol diacrylate NK ESTER A-400 (molecular weight: 508), polyethylene glycol diacrylate NK ESTER A-600 (molecular weight: 742), polyethylene glycol dimethacrylate NK ESTER 9G (molecular weight: 536), and polyethylene glycol dimethacrylate NK ESTER 14G (molecular weight: 770) manufactured by Shin Nakamura Chemical Co., Ltd.; tetraethylene glycol diacrylate V#335HP (molecular weight: 302) manufactured by Osaka Organic Chemical Industry, Ltd.; 3PO-modified trimethylolpropane triacrylate PHOTOMER 4072 (molecular weight: 471, Clog P: 4.90) manufactured by Cognis GmbH; 1,10-decanediol dimethacrylate NK ESTER DOD-N (molecular weight: 310, Clog P: 5.75), tricyclodecanedimethanol diacrylate NK ESTER A-DCP (molecular weight: 304, Clog P: 4.69) and tricyclodecanedimethanol dimethacrylate NK ESTER DCP (molecular weight: 332, ClogP: 5.12) manufactured by Shin Nakamura Chemical Co., Ltd.

The (meth)acrylate compound may also be a polymerizable oligomer. Examples of such a polymerizable oligomer include epoxy(meth)acrylate oligomers, aliphatic urethane (meth)acrylate oligomers, aromatic urethane(meth)acrylate oligomers, polyester(meth)acrylate oligomers, and linear (meth)acrylic oligomers.

Examples of the cationic polymerizable compound include epoxy compounds, vinyl ether compounds, and oxetane compounds. The cationic polymerizable compound may be included alone in the actinic ray curable inkjet ink, or two or more kinds thereof may be included in the ink.

Examples of the epoxy compounds include aromatic epoxides, alicyclic epoxides, and aliphatic epoxides, and in order to increase curability, aromatic epoxides and alicyclic epoxides are preferred.

The aromatic epoxide may be a di- or poly-glycidyl ether obtainable by reacting a polyhydric phenol or an alkylene oxide adduct thereof with epichlorohydrin. Examples of the polyhydric phenol or an alkylene oxide adduct thereof to be reacted include bisphenol A or an alkylene oxide adduct thereof. The alkylene oxide in the alkylene oxide adduct may be ethylene oxide, propylene oxide, or the like.

The alicyclic epoxide may be a cycloalkane oxide-containing compound obtainable by epoxidizing a cycloalkane-containing compound with an oxidizing agent such as hydrogen peroxide or a peracid. The cycloalkane in the cycloalkane oxide-containing compound may be cyclohexene or cyclopentene.

The aliphatic epoxide may be a di- or poly-glycidyl ether obtainable by allowing an aliphatic polyhydric alcohol or an alkylene oxide adduct thereof to react with epichlorohydrin. Examples of the aliphatic polyhydric alcohol include alkylene glycols such as ethylene glycol, propylene glycol, and 1,6-hexanediol. The alkylene oxide in the alkylene oxide adduct may be ethylene oxide, propylene oxide, or the like.

Examples of the vinyl ether compound include monovinyl ethers such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl ether-o-propylene carbonate, dodecyl vinyl ether, diethylene glycol monovinyl ether, and octadecyl vinyl ether; and di- or tri-vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, and trimethylolpropane trivinyl ether. Among these vinyl ether compounds, di- or tri-vinyl ether compounds are preferred in view of curability, adhesiveness, and the like.

The oxetane compound is a compound having an oxetane ring, and examples thereof include the oxetane compounds described in Japanese Patent Application Laid-Open (JP-A)

Nos. 2001-220526, 2001-310937, and 2005-255821. Among the foregoing, the compound represented by General Formula 1 given in paragraph 0089 of JP-A No. 2005-255821, the compound represented by General Formula 2 given in paragraph 0092, the compound represented by General Formula 7 in paragraph 0107, the compound represented by General Formula 8 in paragraph 0109, and the compound represented by General Formula 9 in paragraph 0116 of the same Patent Literature. General Formulas 1, 2 and 7 to 9 given in JP-A No. 2005-255821 are presented below.

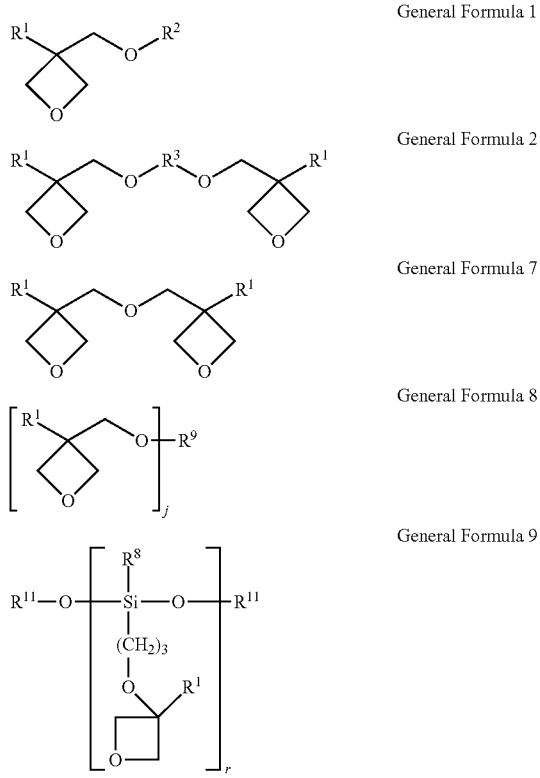

The content of the actinic ray curable compound is preferably 1% to 97% by mass, and more preferably 30% to 95% by mass, with respect to the actinic ray curable inkjet ink.

Ketone Wax and Ester Wax

The ketone wax and ester wax can act as a gelling agent. As used herein, the term "wax" refers to an organic material which is solid at normal temperature and melts when heated; and more specifically, an organic material having a melting point of 30° C. to less than 150° C.

A gelling agent allows the ink to undergo reversible sol-gel phase transition depending on temperature. Such a gelling agent is required at least: 1) to dissolve in an actinic ray curable compound at a temperature higher than the gelling temperature, and 2) to crystallize in the ink at a temperature lower than or equal to the gelling temperature.

With regard to the condition 2), when the gelling agent crystallizes in the ink, it is preferable that plate-shaped crystals, which are crystallization products of the gelling agent, form a space that is three-dimensionally surrounded by the crystals such that the actinic ray-curable compound is enclosed in the space. A structure in which an actinic ray curable compound is enclosed in a space three dimensionally surrounded by plate-shaped crystals in this manner may be referred to as a "card-house structure". When a card-house structure is formed, a liquid actinic ray curable compound can be retained therein, and ink droplets can be pinned. Thereby, merging of droplets can be prevented. In order to form a card-house structure, it is preferable that the actinic ray curable compound and the gelling agent that are dissolved in the ink be compatible with each other. By contrast, if the actinic ray curable compound and the gelling agent that are dissolved in the ink have undergone phase separation, it may be difficult to form the card-house structure.

Furthermore, in order to enhance the ink's pinning property, it is important to enable sol-gel phase transition depending on temperature, as well as to increase the rate of sol-gel phase transition. In order to increase the sol-gel phase transition rate of the ink, it is essential not only to satisfy the conditions 1) and 2) described above, but also to select a gelling agent having high crystallizability (easiness to crystallize). However, many of the gelling agents having high crystallizability exhibit low solubility in ink components even at high temperatures, so that ink ejectability is likely to decrease. The inventors found that in order to increase the sol-gel phase transition rate without compromising ink ejectability, it is effective to combine gelling agents which have similar chemical structure but different degrees of crystallizability; and more specifically, to combine a gelling agent having higher crystallizability with a gelling agent having lower crystallizability.

That is, when the ink is brought to or below a certain temperature, first, crystal nuclei of the gelling agent having higher crystallizability precipitate out. Next, crystals of the gelling agent having lower crystallizability grow and precipitate out around the precipitated crystal nuclei. The sol-gel phase transition rate of an ink containing these gelling agents having different degrees of crystallizability is high enough to be comparable to the sol-gel phase transition rate of an ink containing a gelling agent having higher crystallizability alone. Furthermore, since an ink containing these gelling agents having different degrees of crystallizability contains the gelling agent having lower crystallizability, the ink has high solubility at high temperatures as well as high ejectability. Furthermore, since these gelling agents having different degrees of crystallizability have similar chemical structure, the crystal structure after crystallization to becomes homogeneous, and therefore, the film strength of images after curing can also be increased.

Accordingly, the actinic ray curable inkjet ink of the present invention contains at least two different gelling agents that have similar chemical structure but different degrees of crystallizability. Among the at least two different gelling agents having different degrees of crystallizability contained in the actinic ray curable inkjet ink of the present invention, the gelling agent having higher crystallizability is preferably a ketone wax. A ketone wax refers to a wax having a ketone group. The number of carbon atoms in the molecule that constitutes the ketone wax is preferably 19 to less than 100. If the carbon number in the molecule is 100 or greater, there is a risk that the melting point of the ketone wax may become too high. On the other hand, if the carbon number in the molecule is less than 19, there is a risk that the ketone wax may not be sufficiently crystallized.

The number of ketone groups contained in the molecule that constitutes the ketone wax is not particularly limited, but the number of ketone groups is preferably 1. That is, the ketone wax is preferably a "compound A" represented by the following General Formula 1:

$$R1\text{-}(C=O)\text{-}R2 \quad (1)$$

R1 and R2 in General Formula 1 each independently represent a saturated or unsaturated hydrocarbon group. The hydrocarbon group represented by R1 and R2 may be linear or may be branched. The sum of the numbers of carbon atoms contained in the hydrocarbon groups represented by R1 and R2 is preferably 20 to less than 100.

It is preferable that the hydrocarbon groups represented by R1 and R2 in General Formula 1 each independently represent an aliphatic hydrocarbon group containing a straight chain moiety having 9 to 25 carbon atoms. If the number of carbon atoms in the straight chain moiety contained in the aliphatic hydrocarbon group represented by R1 and R2 is less than 9, the compound does not have sufficient crystallizability. Therefore, the compound may not function as a gelling agent, and also cannot form a space in the card-house structure described above that is large enough to enclose therein the actinic ray curable compound. On the other hand, if the number of carbon atoms in the straight chain moiety contained in the aliphatic hydrocarbon group is greater than 25, the melting point becomes too high and thus the compound does not dissolve in the ink unless ink ejection temperature is raised. When the number of carbon atoms in the straight chain moiety contained in the aliphatic hydrocarbon group is 9 to 25, the compound can form the card-house structure described above while having the crystallizability required as a gelling agent, and there is no chance that the melting point may become too high. The number of carbon atoms in the straight chain moiety contained in the aliphatic hydrocarbon groups of R1 and R2 is preferably 11 to less than 23.

Examples of the aliphatic hydrocarbon group containing a straight chain moiety having 9 to 25 carbon atoms include docosanyl group (C22), icosanyl group (C20), octadecanyl group (C18), heptadecanyl group (C17), hexadecanyl group (C16), pentadecanyl group (C15), tetradecanyl group (C14), tridecanyl group (C13), dodecanyl group (C12), undecanyl group (C11), and decanyl group (C10).

The aliphatic hydrocarbon group represented by R1 and R2 in General Formula 1 may be a saturated or unsaturated aliphatic hydrocarbon group, but from the viewpoint of increasing the gelling temperature or the like, the aliphatic hydrocarbon group is preferably a saturated aliphatic hydrocarbon group (alkylene group). When the aliphatic hydrocarbon groups represented by R1 and R2 in General Formula 1 have similar numbers of carbon atoms, the melting point of the compound in which R1 and R2 in General Formula 1 are saturated aliphatic hydrocarbon groups is often higher than the melting point of the compound in which R1 and R2 in General Formula 1 are unsaturated aliphatic hydrocarbon groups, and the gelling temperature is also likely to be high. The saturated aliphatic hydrocarbon group may be a branched or linear aliphatic hydrocarbon group; but, in order to obtain high crystallizability, the saturated aliphatic hydrocarbon group is preferably a linear saturated aliphatic hydrocarbon group (linear alkylene group). That is, it is particularly preferable that R1 and R2 in the General Formula be each a linear saturated aliphatic hydrocarbon group (linear alkylene group) 11 to less than 23 carbon atoms.

Examples of the compound represented by General Formula 1 include 25-nonatetracontanone (C24-C24), 22-tritetracontanone (C21-C21, melting point: 88° C.), 19-heptatriacontanone (C18-C18), 18-pentatriacontanone (C17-C17, melting point: 84° C.), 21-hentetracontanone (C20-C20), 16-hentriacontanone (C15-C15, melting point: 80° C.), 14-heptacosanone (C13-C13), 12-tricosanone (C11-C11, melting point: 68° C.), 11-hencosanone (C10-C10), 13-heptacosanone (C12-C14), 13-nonacosanone (C12-C16), 13-hentriacontanone (C12-C18), 13-pentatriacontanone (C12-C22), 15-hentriacontanone (C14-C16), 15-propatriacontanone (C14-C18), 15-heptatriacontanone (C14-C22), 17-heptatriacontanone (C16-C18), 17-nonatriacontanone (C16-C22), 19-hentetracontanone (C18-C22), isostearyl palmityl ketone, oleyl stearyl ketone, oleyl behenyl ketone, linol behenyl ketone, and 2-ethyloctyl stearyl ketone. Preferred is 18-pentatriacontanone (C17-C17, melting point: 84° C.).

Examples of commercially available products of the compound represented by General Formula 1 include 18-Pentatriacontanon (manufactured by Alfa Aeser GmbH & Co KG), Hentriacontan-16-on (manufactured by Alfa Aeser GmbH & Co KG), and KAO-WAX T1 (manufactured by Kao Corp.). Since many of these commercially available products are mixtures of two or more kinds, these products may be used after being subjected to isolation and purification as necessary.

The ketone wax that is contained in the actinic ray curable inkjet ink may be one kind of the compound represented by General Formula 1, or may also be a mixture of two or more kinds of the compound represented by General Formula 1.

Among the at least two different gelling agents having different degrees of crystallizability that are contained in the actinic ray curable inkjet ink of the present invention, the gelling agent having lower crystallizability is preferably an ester wax. An ester wax refers to a wax containing an ester group. The number of ester groups in the molecule that constitutes the ester wax is not particularly limited, but the number of ester groups is preferably 1. That is, the ester wax is preferably a compound B represented by the following General Formula 2:

$$R3\text{-}(C=O)\text{-}O\text{-}R4 \qquad (2)$$

R3 and R4 in General Formula 2 each independently represent a saturated or unsaturated hydrocarbon group. The hydrocarbon group may be linear or may be branched. The sum of the numbers of carbon atoms of the hydrocarbon groups represented by R3 and R4 in General Formula 2 is preferably 20 to less than 100.

With regard to General Formula 2, the hydrocarbon group that is represented by R3 and R4 is not particularly limited, but it is preferably an aliphatic hydrocarbon group containing a straight chain moiety having 9 or more and 26 or less carbon atoms. When the number of carbon atoms in the straight chain moiety contained in the aliphatic hydrocarbon group represented by R3 and R4 is 9 to 26, similarly to the compound represented by General Formula 1, the compound can form the card-house structure described above while having the crystallizability required as a gelling agent, and the melting point also does not become too high. In order to obtain a compound represented by General Formula 2 which has crystallizability of a certain degree or higher, it is preferable that the number of carbon atoms of the straight chain moiety contained in the aliphatic hydrocarbon group of R3 be 11 to less than 23, and the number of carbon atoms of the straight chain moiety contained in the aliphatic hydrocarbon group of R4 be 12 to less than 24.

Examples of the aliphatic hydrocarbon group containing a straight chain moiety having 9 to 26 carbon atoms include the same groups as the aliphatic hydrocarbon groups containing a straight chain moiety having 9 to 25 carbon atoms for General Formula 1 described above.

With regard to General Formula 2, the aliphatic hydrocarbon group represented by R3 and R4 may be a saturated or unsaturated aliphatic hydrocarbon group, but the aliphatic hydrocarbon group is preferably a saturated aliphatic hydrocarbon group (alkylene group). Furthermore, the saturated aliphatic hydrocarbon group may be a branched or linear saturated aliphatic hydrocarbon group, but in order to obtain crystallizability of a certain degree or higher, the aliphatic hydrocarbon group is preferably a linear saturated aliphatic hydrocarbon group (linear alkylene group). That is, it is particularly preferable that R3 be a linear alkylene group having 11 to less than 23 carbon atoms, and R4 be a linear alkylene group having 12 to less than 24 carbon atoms.

Examples of the compound represented by General Formula 2 include behenyl behenate (C21-C22, melting point: 70° C.), icosyl icosanoate (C19-C20), stearyl stearate (C17-C18, melting point: 60° C.), palmityl stearate (C17-C16), lauryl stearate (C17-C12), cetyl palmitate (C15-C16, melting point: 54° C.), stearyl palmitate (C15-C18), myristyl myristate (C13-C14, melting point: 43° C.), cetyl myristate (C13-C16, melting point: 50° C.), octyl dodecyl myristate (C13-C20), lauryl laurate (C11-C12, melting point: 30° C.), cetyl caprate (C9-C16, melting point: 30° C.), stearyl oleate (C17-C18), stearyl erucate (C21-C18), stearyl linolate (C17-C18), behenyl oleate (C18-C22), myricyl cerotate (C25-C16), stearyl montanate (C27-C18), behenyl montanate (C27-C22), arachidyl linolate (C17-C20), and palmityl triacontanate (C29-C16).

Examples of commercially available products of the compound represented by General Formula 2 include UNISTAR M-2222SL (manufactured by NOF Corp.), EXCEPARL SS (manufactured by Kao Corp., melting point: 60° C.), EMALEX CC-18 (manufactured by Nihon-Emulsion Co., Ltd.), AMREPS PC (manufactured by Kokyu Alcohol Kogyo Co., Ltd.), EXCEPARL MY-M (manufactured by Kao Corp.), SPERMACETI (manufactured by NOF Corp.), and EMALEX CC-10 (manufactured by Nihon Emulsion Co., Ltd.). Since many of these commercially available products are mixtures of two or more kinds, the commercially available products may also be used after being subjected to separation and purification as necessary.

The ester wax that is included in the actinic ray curable inkjet ink may be formed of one kind of the compound represented by General Formula 2, or may be a mixture in which two or more kinds of the compound represented by General Formula 1 are included.

As described above, usually, the crystallizability of the ketone wax (for example, compound A represented by General Formula 1) is higher than the crystallizability of the ester wax (for example, compound B represented by General Formula 2). However, the crystallizability of the ketone wax and the ester wax varies depending on the number of carbon atoms on the straight chains contained in the respective waxes.

One index of the crystallizability of a compound is melting point. When the aliphatic hydrocarbon group of R1 in General Formula 1 which represents the ketone wax and the aliphatic hydrocarbon group of R3 in General Formula 2 which represents the ester wax are similar (for example, the numbers of carbon atoms of the two groups are close to each other), and the aliphatic hydrocarbon group of R2 in General Formula 1 and the aliphatic hydrocarbon group of R4 in General Formula 2 are similar (for example, the numbers of carbon atoms of the two groups are close to each other), usually, the melting point of the compound A represented by General Formula 1, which represents the ketone wax, is higher than the melting point of the compound B represented by General Formula 2, which represents the ester wax. Furthermore, in order to cause the ink to be gelled homogeneously, it is preferable that the ketone wax and the ester wax have similar chemical structure. For example, it is preferable that the aliphatic hydrocarbon group of R1 in General Formula 1 which represents the ketone wax and the aliphatic hydrocarbon group of R3 in General Formula 2 which represents the ester wax be similar, and that the aliphatic hydrocarbon group of R2 in General Formula 1 and the aliphatic hydrocarbon group of R4 in General Formula 2 be similar. Therefore, it is preferable that the melting point of the ketone wax be higher than the melting point of the ester wax, and it is preferable that the melting point of the compound A represented by General Formula 1 be higher than the melting point of the compound B represented by General Formula 2.

However, when at least one of the ketone wax and the ester wax includes two or more kinds of compounds, it is preferable that the melting point of the compound that is contained in the largest amount (compound which is the main component) among the members of the ketone wax group be higher than the melting point of the compound that is contained in the largest amount (compound which is the main component) among the members of the ester wax group. For example, when the ketone wax group includes a compound A-1 and a compound A-2 (content: compound A-1>compound A-2), and the ester wax group includes a compound B-1 and a compound B-2 (content: compound B-1>compound B-2), it is preferable that the melting point of the compound A-1, which is the main component of the ketone wax group, be higher than the melting point of the compound B-1, which is the main component of the ester wax group.

It is preferable that the melting points of all the compounds of the ketone wax group that are included in the ink be 30° C. to lower than 150° C. from the perspective of the handleability of the ink. Furthermore, in order to enhance the pinning property of the ink, it is more preferable that the melting points be 60° C. to 100° C. It is preferable that the melting points of all the compounds of the ester wax group that are included in the ink be 30° C. to lower than 150° C. from the perspective of the handleability of the ink. The upper limit is more preferably 100° C. In order to enhance the ink ejectability, the melting points of all the compounds of the ester wax group are preferably 30° C. to 75° C.

In order to achieve a good balance between ink ejectability and pinning property, it is preferable that there be a difference to above certain level in the crystallizability (easiness to crystallize) between the ketone wax and the ester wax. Accordingly, it is preferable that there be a difference to above certain level in the melting point of the compound that is the main component in the ketone wax group and the melting point of the compound that is the main component in the ester wax group. Specifically, the difference between the melting point of the compound that is the main component of the ketone wax group and the melting point of the compound that is the main component of the ester wax group is preferably 5° C. or higher, and more preferably 10° C. or higher.

The content ratio of the ketone wax to the ester wax (ketone wax/ester wax) may vary depending on the set temperature of the gelling temperature and/or the degree of the pinning property or ink ejectability that is required; however, the content ratio is preferably 1/9 to 9/1 by mass ratio. In order to increase the gelling temperature of the ink, it is desirable to increase the content ratio of the ketone wax.

The total amount of the ketone wax and the ester wax is preferably 0.5% by mass to less than 10% by mass, and more preferably 1% by mass to less than 7% by mass, with respect to the actinic ray curable inkjet ink. This is because if the total amount of the ketone wax and the ester wax is less than 0.5% by mass, the ink cannot undergo gelation (sol-gel phase transition depending on temperature), and if the total amount is more than 10% by mass, the waxes cannot sufficiently dissolve in the ink, and the ink ejectability is decreased.

The actinic ray curable inkjet ink may further include other gelling agent(s) as necessary, to the extent that the effects of the present invention are not impaired. Examples of other gelling agents include polymer compounds and low-molecular weight compounds, and in order to increase the ink ejectability, low-molecular weight compounds are preferred.

Examples of the polymer compounds as the gelling agent include inulin fatty acid esters such as stearoyl inulin; dextrin fatty acid esters such as dextrin palmitate and dextrin myristate (e.g., RHEOPEARL series, manufactured by Chiba Flour Milling Co., Ltd.); glyceryl behenate eicosanedioate and polyglyceryl eicosane behenate (e.g., NOMCORT series, manufactured by Nisshin Oillio Group, Ltd.).

Examples of the low-molecular weight compounds as the gelling agent include:

aliphatic diketone compounds other than the compounds represented by General Formula 1;

aliphatic ester compounds other than the compounds represented by General Formula 2;

low-molecular weight oil gelling agents described in JP-A Nos. 2005-126507, 2005-255821 and 2010-111790;

amide compounds such as N-lauroyl-L-glutamic acid dibutylamide and N-(2-ethylhexanoyl)-L-glutamic acid dibutylamide (available from Ajinomoto Fine-Techno Co., Inc.);

dibenzylidene sorbitols such as 1,3:2,4-bis-O-benzylidene-D-glusitol (GEL ALL D, available from New Japan Chemical Co., Ltd.);

petroleum-based waxes such as paraffin wax, microcrystalline wax, and petrolactam; plant waxes such as candelilla wax, carnauba wax, rice wax, wood wax, jojoba oil, jojoba solid wax, and jojoba esters; animal waxes such as beeswax, lanolin and whale wax; mineral waxes such as montan wax and hydrogenated waxes; hardened castor oil or hardened castor oil derivatives; modified waxes such as montan wax derivatives, paraffin wax derivatives, microcrystalline wax derivatives, and polyethylene wax derivatives; higher fatty acids such as behenic acid, arachidic acid, stearic acid, palmitic acid, myristic acid, lauric acid, oleic acid, and erucic acid;

higher alcohols such as stearyl alcohol and behenyl alcohol;

hydroxystearic acid such as 12-hydroxystearic acid; 12-hydroxystearic acid derivatives;

fatty acid amides such as lauric acid amide, stearic acid amide, behenic acid amide, oleic acid amide, erucic acid amide, ricinolic acid amide, and 12-hydroxystearic acid amide (for example, NIKKAMIDE series manufactured by Nippon Kasei Chemical Co., Ltd.; ITOHWAX series manufactured by Itoh Oil Chemicals Co., Ltd., and FATTYAMID series manufactured by Kao Corp.);

N-substituted fatty acid amides such as N-stearylstearic acid amide and N-oleylpalmitic acid amide;

special fatty acid amides such as N,N'-ethylenebis(stearylamide), N,N'-ethylenebis(12-hydroxystearylamide), and N,N'-xylenebisstearyl amide;

higher amines such as dodecylamine, tetradecylamine, and octadecyl amine;

fatty acid ester compounds such as a stearylstearic acid, an oleylpalmitic acid, glycerin fatty acid esters, sorbitan fatty acid esters, is propylene glycol fatty acid esters, ethylene glycol fatty acid esters, and polyoxyethylene fatty acid esters (for example, EMALLEX series produced by Nippon Emulsion Co., Ltd., RIKEMAL series produced by Riken Vitamin Co., Ltd., and POEM series produced by Riken Vitamin Co., Ltd);

sucrose fatty acid esters such as sucrose stearate and sucrose palmitate (e.g., RYOTO Sugar Ester series, manufactured by Mitsubishi Kagaku Foods Corp.);

synthetic waxes such as polyethylene wax and $\alpha$-olefin-maleic anhydride copolymer wax (e.g., UNILIN series, manufactured by Baker Petrolite Corp.);

dimer acids; and dimer diols (e.g., PRIPOR series, manufactured by Croda International PLC). These gelling agents may be used singly or two or more kinds thereof may be used in combination.

Photopolymerization Initiator

The actinic ray curable inkjet ink may further include a photopolymerization initiator as necessary. Specifically, in a case where the actinic ray is an electron beam, usually, the ink may not include a photopolymerization initiator, but in a case where the actinic ray is ultraviolet radiation, the ink preferably includes a photopolymerization initiator.

Photopolymerization initiators include intramolecular bond cleavage type initiators and intramolecular hydrogen abstraction type initiators. Examples of the intramolecular bond cleavage type photopolymerization initiators include acetophenone compounds such as diethoxyacetophenone, 2-hydroxy-2-methyl-1-phenylpropan-1-one, benzyl dimethyl ketal, 1-(4-isopropylphenyl)-2-hydroxy-2-methylpropan-1-one, 4-(2-hydroxyethoxy)phenyl (2-hydroxy-2-propyl)ketone, 1-hydroxycyclohexyl phenyl ketone, 2-methyl-2-morpholino(4-thiomethylphenyl)propan-1-one, and 2-benzyl-2-dimethylamino-1-(4-morpholinophenyl)butanone;

benzoins such as benzoin, benzoin methyl ether, and benzoin isopropyl ether;

acylphosphine oxide compounds such as 2,4,6-trimethylbenzoin diphenylphosphine oxide;

benzil; and methyl phenyl glyoxy esters.

Examples of the intramolecular hydrogen abstraction type photopolymerization initiators include benzophenone compounds such as benzophenone, o-benzoylbenzoic acid methyl-4-phenyl benzophenone, 4,4'-dichlorobenzophenone, hydroxybenzophenone, 4-benzoyl-4'-methyldiphenyl sulfide, acrylated benzophenone, 3,3',4,4'-tetra(t-butylperoxycarbonyl)benzophenone, and 3,3'-dimethyl-4-methoxybenzophenone;

thioxanthone compounds such as 2-isopropylthioxanthone, 2,4-dimethyl thioxanthone, 2,4-diethylthioxanthone, and 2,4-dichlorothioxanthone;

aminobenzophenone compounds such as Michler's ketone and 4,4'-diethylaminobenzophenone;

10-butyl-2-chloroacridone, 2-ethylanthraquinone, 9,10-phenanthrenequinone, and camphor-quinone.

The content of the photopolymerization initiator may vary depending on the kind of the actinic ray, the kind of the actinic ray curable compound or the like, but the content is preferably 0.01% by mass to 10% by mass with respect to the actinic ray curable inkjet ink.

The actinic ray curable inkjet ink may include a photoacid generator as the photopolymerization initiator. Examples of the photoacid generator that can be used include the compounds used in chemically amplified photoresists or photocationic polymerization (see Japanese Research Association for Organic Electronics Materials, Ed. "Imejingu yo Yuki Zairyo (Organic Materials for Imaging)", Bunshin Publishing Company (1993), pp. 187-192).

The actinic ray curable inkjet ink may further include a photopolymerization initiator aid, a polymerization inhibitor and the like as necessary. The photopolymerization initiator aid may be a tertiary amine compound, and is preferably an aromatic tertiary amine compound. Examples of the aromatic tertiary amine compound include N,N-dimethylaniline, N,N-diethylaniline, N,N-dimethyl-p-toluidine, N,N-dimethylamino-p-benzoic acid ethyl ester, N,N-dimethylamino-p-benzoic acid isoamyl ethyl ester, N,N-dihydroxyethylaniline, triethylamine, and N,N-dimethylhexylamine. Among the foregoing, N,N-dimethylamino-p-benzoic acid ethyl ester and N,N-dimethylamino-p-benzoic acid isoamyl ethyl ester are preferred. These compounds may be used singly, or two or more kinds may be used in combination.

Examples of the polymerization initiator include (alkyl) phenol, hydroquinone, catechol, resorcin, p-methoxyphenol, t-butylcatechol, t-butylhydroquinone, pyrogallol, 1,1-picrylhydrazyl, phenothiazine, p-benzoquinone, nitrosobenzene, 2,5-di-tert-butyl-p-benzoquinone, dithiobenzoyl disulfide, picric acid, cupferron, aluminum N-nitrosophenylhydroxylamine, tri-p-nitrophenylmethyl, N-(3-oxyanilino-1,3-dimethylbutylidene)aniline oxide, dibutylcresol, cyclohexanone oxime cresol, guaiacol, o-isopropylphenol, butyraldoxime, methyl ethyl ketoxime, and cyclohexanone oxime.

Colorant

The actinic ray curable inkjet ink may further include a colorant as necessary. The colorant may be a dye or a pigment, but from the viewpoint of having satisfactory dispersibility in the constituent components of the ink and having excellent weather resistance, a pigment is preferred. There are no particular limitations on the pigment; examples thereof include organic pigments or inorganic pigments assigned the numbers that are described in the Color Index.

Examples of red or magenta pigments include Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, and 257; Pigment Violet 3, 19, 23, 29, 30, 37, 50, and 88; and Pigment Orange 13, 16, 20, and 36. Examples of blue or cyan pigments include Pigment Blue 1, 15, 15:1, 15:2, 15:3, 15:4, 15:6, 16, 17-1, 22, 27, 28, 29, 36, and 60. Examples of green pigments include Pigment Green 7, 26, 36, and 50. Examples of yellow pigments include Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, and 193. Examples of black pigments include Pigment Black 7, 28, and 26.

Examples of commercially available pigment products include CHROMOFINE YELLOW 2080, 5900, 5930, AF-1300, and 2700L; CHROMOFINE ORANGE 3700L and 6730; CHROMOFINE SCARLET 6750; CHROMOFINE MAGENTA 6880, 6886, 6891N, 6790, and 6887; CHROMOFINE VIOLET RE; CHROMOFINE RED 6820 and 6830; CHROMOFINE BLUE HS-3, 5187, 5108, 5197, 5085N, SR-5020, 5026, 5050, 4920, 4927, 4937, 4824, 4933GN-EP, 4940, 4973, 5205, 5208, 5214, 5221, and 5000P; CHROMOFINE GREEN 2GN, 2GO, 2G-550D, 5310, 5370, and 6830; CHROMOFINE BLACK A-1103; SEIKA FAST YELLOW 10 GH, A-3, 2035, 2054, 2200, 2270, 2300, 2400(B), 2500, 2600, ZAY-260, 2700(B), and 2770; SEIKA FAST RED 8040, C405(F), CA120, LR-116, 1531B, 8060R, 1547, ZAW-262, 1537B, GY, 4R-4016, 3820, 3891, and ZA-215; SEIKA FAST CARMINE 6B1476T-7, 1483LT, 3840, and 3870; SEIKA FAST BORDEAUX 10B-430; SEIKA LIGHT ROSE R40; SEIKA LIGHT VIOLET B800 and 7805; SEIKA FAST MAROON 460N; SEIKA FAST ORANGE 900 and 2900; SEIKA LIGHT BLUE C718 and A612; Cyanine Blue 4933M, 4933GN-EP, 4940, and 4973 (manufactured by Dainichiseika Color & Chemicals Manufacturing Co., Ltd.); KET Yellow 401, 402, 403, 404, 405, 406, 416, and 424; KET Orange 501; KET Red 301, 302, 303, 304, 305, 306, 307, 308, 309, 310, 336, 337, 338, and 346; KET Blue 101, 102, 103, 104, 105, 106, 111, 118, and 124; KET Green 201 (manufactured by Dainippon Ink & Chemicals, Inc.); COLORTEX Yellow 301, 314, 315, 316, P-624, 314, U10GN, U3GN, UNN, UA-414, and U263; FINECOL Yellow T-13 and T-05; Pigment Yellow 1705; COLORTEX Orange 202; COLORTEX Red 101, 103, 115, 116, D3B, P-625, 102, H-1024, 105C, UFN, UCN, UBN, U3BN, URN, UGN, UG276, U456, U457, 105C, and USN; COLORTEX Maroon 601; COLORTEX Brown B610N; COLORTEX Violet 600; Pigment Red 122; COLORTEX Blue 516, 517, 518, 519, A818, P-908, and 510; COLORTEX Green 402 and 403; COLORTEX Black 702; U905 (manufactured by Sanyo Color Works, Ltd.); LIONOL Yellow 1405G; LIONOL Blue FG7330, FG7350, FG7400G, FG7405G, ES, and ESP-S (manufactured by Toyo Ink Group); Toner Magenta E02; Permanent Rubin F6B; Toner Yellow HG; Permanent Yellow GG-02; HOSTAPEAM Blue B2G (manufactured by Hoechst Industry, Ltd.); NOVOPERM P-HG; HOSTAPERM Pink E; HOSTAPERM Blue B2G (manufactured by Clariant International, Ltd.); carbon black #2600, #2400, #2350, #2200, #1000, #990, #980, #970, #960, #950, #850, MCF88, #750, #650, MA600, MA7, MA8, MA11, MA100, MA100R, MA77, #52, #50, #47, #45, #45L, #40, #33, #32, #30, #25, #20, #10, #5, #44, and CF9 (manufactured by Mitsubishi Chemical Corp.).

Dispersion of pigment can be effected using, for example, ball mill, sand mill, attritor, roll mill, agitator, HENSCHEL mixer, colloid mill, ultrasonic homogenizer, pearl mill, wet jet mill, or paint shaker.

The actinic ray curable inkjet ink may further include a dispersant in order to increase dispersibility of the pigment. Examples of the dispersant include hydroxyl group-containing carboxylic acid esters, salts of long-chain polyaminoamides and high-molecular weight acid esters, salts of high-molecular weight polycarboxylic acids, salts of long-chain polyaminoamides and polar acid esters, high molecular weight unsaturated acid esters, polymer copolymerization products, modified polyurethanes, modified polyacrylates, polyether ester type-anionic active agents, naphthalenesulfonic acid-formalin condensate salts, aromatic sulfonic acid-formalin condensate salts, polyoxyethylene alkyl phosphoric acid esters, polyoxyethylene nonyl phenyl ethers, and stearyl amine acetates. Examples of commercially available dispersant products include SOLSPERSE series of Avecia Biotechnology, Inc. and PB series of Ajinomoto Fine-Techno Co., Inc.

The actinic ray curable inkjet ink may further include a dispersion aid as necessary. The dispersion aid may be selected depending on the pigment.

The total amount of the dispersant and the dispersion aid is preferably 1% to 50% by mass with respect to the pigment.

The actinic ray curable inkjet ink may further include a dispersion medium for dispersing the pigment, if necessary. As the dispersion medium, a solvent may be incorporated into the ink, but in order to suppress the remaining of residual solvent on the images formed, it is preferable to use an actinic ray curable compound such as described above (particularly, a monomer having low viscosity) as the dispersion medium.

Dispersion of the pigment is preferably carried out such that the average particle size of the pigment particles is preferably 0.08 μm to 0.5 μm, and the maximum particle size is preferably 0.3 μm to 10 μm, and more preferably 0.3 μm to 3 μm. Dispersion of the pigment is controlled by the selection of the pigment, dispersant and dispersion medium, dispersion conditions, filtration conditions, and the like.

The dye may be an oil-soluble dye or the like. Examples of the oil-soluble dye include the following various dyes. Examples of magenta dyes include MS Magenta VP, MS Magenta HM-1450, MS Magenta HSo-147 (all manufactured by Mitsui Toatsu Chemicals, Inc.); AIZEN SOT Red-1, AIZEN SOT Red-2, AIZEN SOT Red-3, AIZEN SOT Pink-1, SPIRON Red GEH SPECIAL (all manufactured by Hodogaya Chemical Co., Ltd.); RESOLIN Red FB 200%, MACROLEX Red Violet R, MACROLEX ROT5B (all manufactured by Bayer Japan, Ltd.); KAYASET Red B, KAYASET Red 130, KAYASET Red 802 (all manufactured by Nippon Kayaku Co., Ltd.); PHIILOXIN, ROSE BENGAL, ACID Red (all manufactured by Daiwa Kasei Co., Ltd.); HSR-31, DIARESIN Red K (all manufactured by Mitsubishi Chemical Corp.); and Oil Red (manufactured by BASF Japan, Ltd.).

Examples of cyan dyes include MS Cyan HM-1238, MS Cyan HSo-16, Cyan HSo-144, MS Cyan VPG (all manufactured by Mitsui Toatsu Co., Ltd.); AIZEN SOT Blue-4 (manufactured by Hodogaya Chemical Co., Ltd.); RESOLIN BR. Blue BGLN 200%, MACROLEX Blue RR, CERES Blue GN, SIRIUS SUPRATURQ. Blue Z-BGL, SIRIUS SUPRATURQ. Blue FB-LL 330% (all manufactured by Bayer Japan, Ltd.); KAYASET Blue FR, KAYASET Blue N, KAYASET Blue 814, Turq. Blue GL-5 200, Light Blue BGL-5 200 (all manufactured by Nippon Kayaku Co., Ltd.); DAIWA Blue 7000, OLEOSOL Fast Blue GL (all manufactured by Daiwa Kasei Co., Ltd.); DIARESIN Blue P (manufactured by Mitsubishi Chemical Corp.); SUDAN Blue 670, NEOPEN Blue 808, and ZAPON Blue 806 (all manufactured by BASF Japan, Ltd.).

Examples of yellow dyes include MS Yellow HSm-41, Yellow KX-7, Yellow EX-27 (Mitsui Toatsu); AIZEN SOT Yellow-1, AIZEN SOT Yellow-3, AIZEN SOT Yellow-6 (all manufactured by Hodogaya Chemical Co., Ltd.); MACROLEX Yellow 6G, MACROLEX FLUOR Yellow 10GN (all manufactured by Bayer Japan, Ltd.); KAYASET Yellow SF-G, KAYASET Yellow 2G, KAYASET Yellow A-G, KAYASET Yellow E-G (all manufactured by Nippon Kayaku Co., Ltd.); DAIWA Yellow 330HB (manufactured by Daiwa Kasei Co., Ltd.); HSY-68 (manufactured by Mitsubishi Chemical Corp.); SUDAN Yellow 146, and NEOPEN Yellow 075 (all manufactured by BASF Japan, Ltd.).

Examples of black dyes include MS Black VPC (manufactured by Mitsui Toatsu Co., Ltd.); AIZEN SOT Black-1, AIZEN SOT Black-5 (all manufactured by Hodogaya Chemical Co., Ltd.); RESORIN Black GSN 200%, RESOLIN Black BS (all manufactured by Bayer Japan, Ltd.); KAYASET Black A-N (manufactured by Nippon Kayaku Co., Ltd.); DAIWA Black MSC (manufactured by Daiwa Kasei Co., Ltd.); HSB-202 (manufactured by Mitsubishi Chemical Corp.); NEPTUNE Black X60, and NEOPEN Black X58 (all manufactured by BASF Japan, Ltd.).

The content of the pigment or dye is preferably 0.1% to 20% by mass, and more preferably 0.4% to 10% by mass, with respect to the actinic ray curable inkjet ink. The reason for this is that if the content of the pigment or dye is too low, color development of the resulting images is insufficient, and if the content is too high, the viscosity of the ink increases, and ejectability decreases.

Other Components

The actinic ray curable inkjet ink may further include other components as necessary. The other components may be various additives or other resins. Examples of the additives include surfactants, leveling agents, matting agents, ultraviolet absorbers, infrared absorbers, antibacterial agents, and basic compounds for enhancing the storage to stability of ink. Examples of the basic compounds include basic alkali metal compounds, basic alkaline earth metal compounds, and basic organic compounds such as amines. Examples of the other resins include resins for regulating the properties of a cured film, and examples thereof include polyester resins, polyurethane resins, vinyl resins, acrylic resins, rubber resins, and waxes.

Since the actinic ray curable inkjet ink contains the gelling agent as described above, the ink undergoes reversible sol-gel phase transition depending on temperature. The actinic ray curable ink that undergoes sol-gel phase transition is liquid at high temperatures (e.g., about 80° C.), and therefore, the ink can be discharged from an inkjet printing head. When the actinic ray curable inkjet ink is discharged at a high temperature, ink droplets (dots) are landed on a recording medium and naturally cooled for gelation. Thus, merging of adjacent dots is prevented and therefore image quality can be enhanced.

In order to increase ink ejectability, it is preferable that the ink's viscosity at high temperatures be at or below a certain level. Specifically, it is preferable that the viscosity at 80° C. of the actinic ray curable inkjet ink be 3 to 20 mPa·s. On the other hand, in order to prevent the merging of adjacent dots, it is preferable that the ink's viscosity at normal temperature after landing be at or above a certain level. Specifically, the viscosity at 25° C. of the actinic ray curable inkjet ink is preferably 1,000 mPa·s or higher.

The gelling temperature of the ink is preferably from 40° C. to 70° C., and more preferably from 50° C. to 65° C. This is because in the case where the ejection temperature is close to 80° C., if the gelling temperature of the ink exceeds 70° C., gelling is likely to occur at the time of ejection, causing reduced ejectability, and if the gelling temperature is lower than 40° C., after landing on the recording medium, gelation of ink does not occur rapidly. The gelling temperature refers to a temperature at which an ink in sol state shows a reduction in fluidity due to gelation while the ink is cooled.

Viscosity at 80° C., viscosity at 25° C., and gelling temperature of the ink can be determined by measuring a change in dynamic viscoelasticity of the ink with temperature using a rheometer. Specifically, a temperature-dependent curve of viscosity is obtained by heating the ink to 100° C., and cooling the ink to 20° C. under the conditions of a shear rate of 11.7 (/s) and a rate of temperature decrease of 0.1° C./s. Then, the viscosity at 80° C. and the viscosity at 25° C. can be determined by reading the viscosities at 80° C. and 25° C., respectively, from the temperature-dependent curve of viscosity. The gelling temperature can be determined as the temperature at which viscosity reaches 200 mPa·s in the temperature-dependent curve of viscosity.

Regarding the rheometer, a stress control type rheometer, PHYSICA MCR series, manufactured by Anton Paar GmbH can be used. The diameter of the cone plate can be set to 75 mm, and the cone angle can be set to 1.0°.

The actinic ray curable inkjet ink can be obtained by mixing the components, including the actinic ray curable compound and the gelling agents described above, under heating.

The actinic ray curable inkjet ink of the present invention includes two or more kinds of compounds having different degrees of crystallizability (ketone wax and ester wax), as described above. Therefore, ejectability at a high temperature of the actinic ray curable inkjet ink is high, and since the sol-gel phase transition rate is also high, after landing, ink gelation occurs rapidly (i.e., pinning property are high). Thus, merging of adjacent dots is prevented, and image quality can be enhanced.

With regard to the actinic ray curable inkjet ink of the present invention, in order to enhance the ink ejectability from an inkjet head, the temperature of the ink when loaded into the inkjet head is preferably set to a temperature from (gelling temperature+10)° C. to (gelling temperature+30)° C. of the ink. If the temperature of the ink in the inkjet head is lower than (gelling temperature+10)° C., the ink gels inside the inkjet head or at the nozzle surface, and thus ink ejectability is likely to decrease. On the other hand, if the temperature of the ink inside the inkjet head is higher than (gelling temperature+30)° C., the temperature of is too high, and as a result, the ink components may deteriorate.

2. Inkjet Printing Apparatus and Image Recording Method Using Same

The inkjet printing apparatus used in the present invention that employs actinic ray curable ink is now described. Inkjet printing apparatus that employ actinic ray curable ink come in two types: line (single-pass) inkjet printing apparatus and serial inkjet printing apparatus. The inkjet printing apparatus may be selected depending on the desired resolution of images or the printing speed; however, from the viewpoint of achieving high-speed printing, line (single-pass) printing is preferred over serial printing.

Figure 1B:
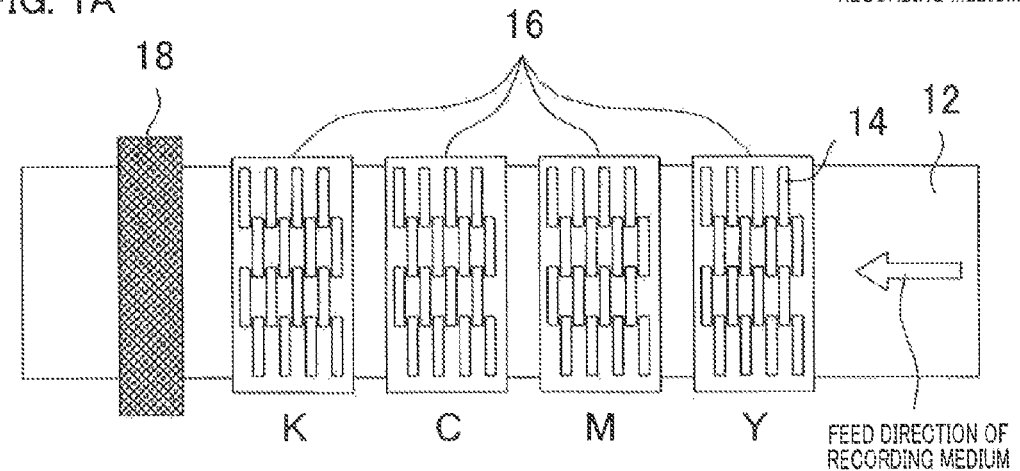

FIGS. 1A and 1B are diagrams illustrating an example of the configuration of the essential part of a line inkjet printing apparatus. FIG. 1A is a side view, and FIG. 1B is a top view. As shown in FIGS. 1A and 1B, inkjet printing apparatus 10 includes head carriage 16 that houses therein a plurality of inkjet heads 14; actinic ray irradiation section 18 that is disposed on the downstream side of head carriage 16 (feed direction of recording medium) so as to cover the full width of recording medium 12; and temperature control section 19 that is disposed on the lower surface of recording medium 12.

Head carriage 16 is fixedly disposed so as to cover the full width of recording medium 12, and houses therein a plurality of inkjet heads 14 that are provided for the respective corresponding colors. The inkjet printing apparatus is so configured that inks are supplied to inkjet heads 14. For example, the inkjet printing apparatus may be configured such that an ink is supplied from an ink cartridge or the like (not shown) that is detachably mounted on inkjet printing apparatus 10, either directly or by ink supply means (not shown).

Multiple inkjet heads 14 are provided for the respective corresponding colors along the feed direction of recording medium 12. The number of inkjet heads 14 that are disposed in the feed direction of recording medium 12 is set depending on the nozzle density of inkjet head 14 and the resolution of an image to be printed thereon. For example, in the case of forming an image at a resolution of 1,440 dpi using inkjet head 14 with a droplet volume of 2 pl and a nozzle density of 360 dpi, four inkjet heads 14 may be disposed in a staggered manner in the feed direction of recording medium 12. Furthermore, in the case of forming an image at a resolution of 720×720 dpi using inkjet head 14 with a droplet volume of 6 pl and a nozzle density of 360 dpi, two inkjet heads 14 may be disposed in a staggered manner. The term dpi represents the number of ink droplets (dots) per 2.54 cm.

Actinic ray irradiation section 18 covers the full width of recording medium 12 and is disposed on the downstream side of head carriage 16 in the feed direction of the recording medium. Actinic ray irradiation section 18 applies an actinic ray to the droplets that have been discharged by inkjet head 14 and landed on the recording medium, and thereby cures the droplets.

In the case where the actinic ray is ultraviolet radiation, examples of actinic ray irradiation section 18 (ultraviolet irradiating means) include fluorescent tubes (low pressure mercury lamp and germicidal lamp), a cold cathode tube, an ultraviolet laser, low pressure, medium pressure and high pressure mercury lamps having an operation pressure of several hundred Pa to 1 MPa, a metal halide lamp, and an LED. From the viewpoint of curability, ultraviolet irradiation means that irradiates ultraviolet radiation at a dose of 100 $mW/cm^2$ or more; specifically, a high pressure mercury lamp, a metal halide lamp, an LED and the like are preferred, and from the viewpoint of having less power consumption, an LED is more preferred. Specifically, a water-cooled LED with a wavelength of 395 nm manufactured by Phoseon Technology, Inc. can be used.

In the case where the actinic ray is electron beams, examples of actinic ray irradiation section 18 (electron beam irradiation means) include electron beam irradiation means using scanning mode, curtain beam mode, broad beam mode or the like; however, from the viewpoint of the processing capacity, electron beam irradiation means using curtain beam mode is preferred. Examples of the electron beam irradiation means include "CURETRON EBC-200-20-30" manufactured by Nisshin High Voltage Corp., and "Min-EB" manufactured by AIT Corp.

Temperature control section 19 is disposed on the lower surface of recording medium 12, and maintains recording medium 12 at a predetermined temperature. Temperature control section 19 may be, for example, any of the various heaters known in the art.

Hereinafter, an image recording method using line inkjet printing apparatus 10 will be described. Recording medium 12 is fed between head carriage 16 and temperature control section 19 of inkjet printing apparatus 10. On the other hand, recording medium 12 is heated to a predetermined temperature by means of temperature control section 19. Next, an ink having high temperature is discharged from inkjet head 14 of head carriage 16 and adheres (lands) onto recording medium 12. The ink droplets that have adhered onto recording medium 12 are irradiated with an actinic ray by means of actinic ray irradiation section 18 and are thereby cured.

The temperature of the ink inside inkjet head 14 at the time of discharging the ink from inkjet head 14 is preferably set to a temperature 10° C. to 30° C. higher than the gelling temperature of the ink, in order to increase ink ejectability. If the ink temperature inside inkjet head 14 is lower than (gelling temperature+10)° C., the ink gels inside inkjet head 14 or at the nozzle surface, and ink ejectability is likely to decrease. On the other hand, if the temperature of the ink inside inkjet head 14 is higher than (gelling temperature+30)° C., since the temperature of the ink is too high, the ink components may deteriorate.

The droplet volume per one droplet that is discharged from each nozzle of inkjet head 14 may vary with the resolution of the image, but in order to form an image of high resolution, the droplet volume is preferably 1 pl to 10 pl, and more preferably 0.5 pl to 4.0 pl.

In order to suppress merging of adjacent ink droplets, irradiation of the actinic ray is preferably carried out within 10 seconds, preferably within 0.001 seconds to 5 seconds, and more preferably within 0.01 seconds to 2 seconds, after ink droplets adhere onto the recording medium. Irradiation of the actinic ray is preferably carried out after the ink has been discharged from all inkjet heads 14 that are housed in head carriage 16.

In the case where the actinic ray is an electron beam, in order to achieve sufficient curing, the accelerating voltage of the electron beam irradiation is preferably set to 30 kV to 250 kV, and more preferably to 30 kV to 100 kV. When the accelerating voltage is 100 kV to 250 kV, the amount of electron beam irradiation is preferably 30 kGy to 100 kGy, and more preferably 30 kGy to 60 kGy.

The total ink film thickness after curing is preferably 2 μm to 25 μm. The "total ink film thickness" is a maximum value of the ink film thickness drawn on a recording medium.

Figure 2:
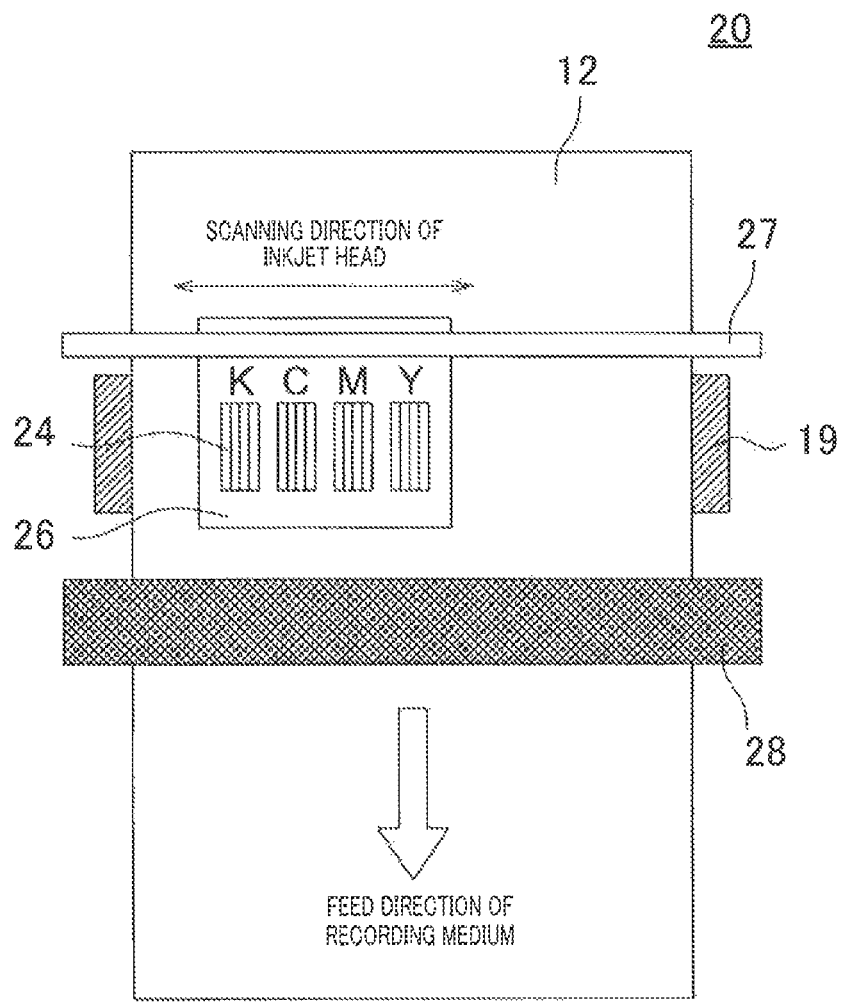
FIG. 2 is a diagram illustrating an example of the configuration of the essential part of an inkjet printing apparatus employing serial printing.

FIG. 2 is a diagram illustrating an example of the configuration of the essential part of serial inkjet printing apparatus 20. As shown in FIG. 2, inkjet printing apparatus 20 can be configured in the same manner as the inkjet printing apparatus shown in FIG. 1, except that the apparatus includes head carriage 26 that has a width smaller than the full width of the recording medium and houses therein a plurality of inkjet heads 24, instead of head carriage 16 that is fixedly disposed so as to cover the full width of the recording medium; and guide section 27 for moving head carriage 26 in the width direction of recording medium 12.

In serial inkjet printing apparatus 20, while head carriage 26 is moved by guide section 27 in the width direction of recording medium 12, ink is discharged from inkjet heads 24 housed in head carriage 26. Each time after head carriage 26 has moved from one side to the other of recording medium 12 in the width direction (for each pass), recording medium 12 is fed in the feed direction. Except for these operations, the inkjet printing apparatus is operated almost in the same manner as in the case of line inkjet printing apparatus 10 described above, and thereby an image are printed.

EXAMPLES

Hereinafter, the present invention will be described in more detail by way of Examples. The scope of the present invention is not construed to be limited by these Examples.

1. Evaluation of Monochromatic Images

Example 1

1) Preparation of Pigment Dispersion Liquid 1 (M: Magenta)

The dispersant, actinic ray curable compound and polymerization inhibitor described below were introduced into a stainless steel beaker, and while the beaker was heated on a hot plate at 65° C., the content was heated and stirred for 1 hour for dissolution. The solution thus obtained was cooled to room temperature, and then magenta pigment 1 described below was added thereto in an amount of 21 parts by mass. The mixture was introduced into a glass bottle together with 200 g of zirconia beads having a diameter of 0.5 mm, the glass bottle was tightly sealed, and the mixture was subjected to a dispersion treatment for 8 hours in a paint shaker. Thereafter, the zirconia beads were removed, and thus pigment dispersion liquid 1 having the composition described below was prepared.

[Composition of Pigment Dispersion Liquid 1]
Dispersant:
　AJISPER PB824 (manufactured by Ajinomoto Fine-Techno Co., Inc.) 9 parts by mass
Actinic Ray Curable Compound:
　APG-200 (tripropylene glycol diacrylate, manufactured by Shin Nakamura Chemical Co., Ltd.) 70 parts by mass
Polymerization Inhibitor:
　IRGASTAB UV10 (manufactured by Ciba Japan K.K.) 0.02 parts by mass
Magenta Pigment 1:
　Pigment Red 122 (manufactured by Dainichiseika Color & Chemicals Manufacturing Co., Ltd., CHROMOFINE RED 6112JC)

2) Preparation of Inks

Pigment dispersion liquid 1 thus obtained was mixed with the compounds described below, and the mixture was heated to 80° C. and stirred. The solution thus obtained was filtered through a #3000 metal mesh filter under heating, and then was cooled to prepare an ink.

[Composition of Ink]
Actinic Ray Curable Compound:
　A-400 (polyethylene glycol #400 diacrylate, manufactured by Shin Nakamura Chemical Co., Ltd.) 32.0 parts by mass;
　SR494 (4EO-modified pentaerythritol tetraacrylate, manufactured by Sartomer Company, Inc.) 17.0 parts by mass; and
　SR499 (6EO-modified trimethylolpropane triacrylate, manufactured by Sartomer Company, Inc.) 17.9 parts by mass
Ketone Wax (Compound a Represented by General Formula 1):
　18-Pentatriacontanone 1.5 parts by mass; and
　16-Hentriacontanone 0.5 parts by mass;
Ester Wax (Compound B Represented by General Formula 2):
　Behenyl behenate 1.0 part by mass
Polymerization inhibitor: IRGASTAB UV10 (manufactured by Ciba Japan K.K.) 0.1 parts by mass
Photopolymerization Initiator:
　TPO (phosphine oxide, DAROCURE TPO, manufactured by Ciba Japan K.K.) 6.0 parts by mass
Photopolymerization Initiator Aid:
　ITX (isopropylthioxanthone, SPEEDCURE ITX manufactured by Lambson, Ltd.) 2.0 parts by mass; and
　EDB (amine aid, SPEEDCURE EDB manufactured by Lambson, Ltd.) 3.0 parts by mass
Pigment dispersion liquid 1: 19.0 parts by mass Examples 2 to 8

Inks were prepared in the same manner as in Example 1, except that the compositions of the inks were modified as shown in Table 1.

Examples 9 to 16

Inks were prepared in the same manner as in Example 1, except that the compositions of the inks were modified as shown in Table 2.

Comparative Examples 1 to 5

Inks were prepared in the same manner as in Example 1, except that the compositions of the inks were modified as shown in Table 3.

Examples 17 to 19

Inks were prepared in the same manner as in Example 1, except that the compositions of the inks were modified as shown in Table 4.

The properties (viscosities at 25° C. and 80° C., and gelling temperature) of the inks obtained in Examples and Comparative Examples were measured by the methods described below.

Measurement of Ink Properties

The ink thus obtained was loaded on a stress control type rheometer (PHYSICA MCR300, manufactured by Anton Paar GmbH) capable of temperature control. Subsequently, the ink was heated to 100° and then was cooled to 20° C. under the conditions of temperature decline rate of 0.1° C./s and shear rate of 11.7 (/s), and thus the dynamic viscoelasticity at the time of temperature decrease was measured. The measurement of the dynamic viscoelasticity was carried out using a cone plate (CP75-1, manufactured by Anton Paar GmbH) having a diameter of 75.033 mm and a cone angle of 1.017°. Furthermore, the temperature control was carried out by a Peltier element type temperature controller (TEK150P/MC1) attached to PHYSICA MCR300.

In the temperature-dependent change curve of dynamic viscoelasticity thus obtained, the viscosities at 25° C. and 80° C. were respectively read and were defined as the "viscosity at 25° C." and the "viscosity at 80° C.". The temperature at which the viscosity was 200 cP or greater was read from the temperature-dependent curve of dynamic viscoelasticity thus obtained, and the temperature was defined as the "gelling temperature (° C.)".

Furthermore, images were formed by the following method using to the inks obtained in Examples and Comparative Examples and using the line inkjet printing apparatus.

Image Forming Method (Method for Forming Monochromatic Image)

Monochromatic (magenta) images were formed using the line inkjet printing apparatus. Specifically, printing coated paper A (OK TOPCOAT, basis weight: 128 g/m², manufactured by Oji Paper Co., Ltd.) was provided, and the temperature was regulated to 25° C. by means of the temperature control section. On the other hand, an ink thus obtained was loaded into the inkjet head of the inkjet printing apparatus, and the ink was heated to obtain an ink temperature of 80° C. Then, ink droplets were discharged onto the printing coated paper A, and outline characters and solid images having a size of 5 cm×5 cm were formed. Thereafter, ultraviolet radiation was irradiated using an LED lamp (water-cooled LED at 395 nm manufactured by Phoseon Technology, Inc.) that was disposed on the downstream side of the inkjet printing apparatus to cure the ink, and thus images were formed.

For the inkjet head, piezo heads having 512 nozzles (256 nozzles×2 rows, staggered array, nozzle pitch in one row: 360 dpi) with a nozzle diameter of 20 mm were used. The discharge conditions were set such that the droplet volume of one liquid droplet was 2.5 pl, and recording was carried out at a resolution of 1440 dpi×1440 dpi by ejecting droplets at a droplet speed of about 6 m/s. The recording speed was set to 500 mm/s. Image formation was carried out at 23° C. and 55% RH. The term dpi stands for the number of dots per 2.54 cm.

Subsequently, 1) image quality of the characters, 2) density unevenness, 3) rub resistance, and 4) ejection stability of the ink were evaluated by the following methods.

1) Image Quality of Characters

Outline characters of Chinese characters "⬜, ⬜, ⬜, ⬜, ⬜, ⬜, ⬜, ⬜, ⬜, ⬜, and ⬜" were printed on printing coated paper A by the image forming method described above. The outline characters were printed in 3-point and 5-point MS Mincho font at a resolution of 1400 dpi×1440 dpi. The printed images of characters were visually observed. The quality of the characters was evaluated on the basis of the following criteria.

A: All of the 3-point outline characters are recorded clearly even into details.

B: The 3-point outline characters are only partially legible, but all of the 5-point outline characters are legible.

C: Even some of the 5-point outline characters are illegible.

2) Density Unevenness

Solid images having a size of 5 cm×5 cm were formed on printing coated paper A by the image forming method described above, and the images were visually observed. The density unevenness of the solid images was evaluated on the basis of the following criteria.

A: Density unevenness is not recognized even if the image is observed at a position 15 cm apart from the image.

B: Density unevenness is recognized in parts of the image when the image is observed at a position 15 cm apart from the image, but when the image is observed at a position 30 cm apart from the image, density unevenness is not recognized.

C: Density unevenness is recognized even if the image is observed at a position 30 cm apart from the image.

3) Rub Resistance

Solid images having a size of 5 cm×5 cm were formed on printing coated paper A by the image forming method described above. In accordance with the procedure described in "JIS Standards K5701-1 6.2.3 Rub Resistance Test", another sheet of printing coated paper A cut to an appropriate size was placed on the solid images thus formed, a load was applied thereon, and the paper sheet was rubbed against the image. Thereafter, an extent of decrease in the density of the solid image was visually observed. Rub resistance was evaluated according to the following criteria.

A: Even though the image is rubbed 50 strokes or more with the paper sheet, absolutely no changes are observed in image density.

B: Reduction in image density is recognized at the time when the image has been rubbed 50 strokes, but the reduction is a practically acceptable level.

C: Obvious reduction in image density is observed at the time when the image has been rubbed fewer than 50 strokes, and the reduction is a practically intolerable level.

4) Ink Ejection Stability

The ink thus obtained was loaded into the inkjet head of the inkjet printing apparatus, and the occurrence of defective nozzle at the time of ejecting ink droplets from the inkjet head was inspected by visual observation. Ejection stability was evaluated on the basis of the following criteria.

A: Absolutely no defective nozzles were not observed.

B: Among all of the 512 nozzles, 1 to 4 defective nozzles were observed.

C: Among all of the 512 nozzles, 5 or more defective nozzles were observed.

The evaluation results of Examples 1 to 8 are presented in Table 1; the evaluation results of Examples 9 to 16 in Table 2; the evaluation results of Comparative Examples 1 to 5 in Table 3; and the evaluation results of Examples 17 to 19 in Table 4.

TABLE 1

| | | Compound name | Number of carbon atoms | Melting point (° C.) | | Ex. 1 | Ex. 2 | Ex. 3 | Ex. 4 | Ex. 5 | Ex. 6 | Ex. 7 | Ex. 8 |
|---|---|---|---|---|---|---|---|---|---|---|---|---|---|
| Ink composition | Gelling agent | Ketone wax | 22-Tritetracontanone | C21-C21 | 88 | (mass %) | | | | | | | | 0.5 |
| | | | 18-Pentatriacontanone | C17-C17 | 84 | | 1.5 | 1.5 | 1.3 | 1.5 | 1.0 | | | 0.5 |
| | | | 16-Hentriacontanone | C15-C15 | 80 | | 0.5 | 0.5 | 0.5 | 0.5 | | | 1.0 | |
| | | | 12-Tricosanone | C11-C11 | 68 | | | | 0.2 | | | 3.0 | | |
| | | Ester wax | Behenyl behenate | C21-C22 | 70 | (mass %) | 1.0 | | | 2.0 | | | 1.0 | |
| | | | Stearyl stearate | C17-C18 | 60 | | | 2.5 | 2.0 | | | | | 1.0 |
| | | | Cetyl palmitate | C15-C16 | 54 | | | 0.5 | | | 1.0 | 2.0 | | |
| | | | Myristyl myristate | C13-C14 | 43 | | | | | | 3.0 | | | |
| | | | Cetyl myristate | C13-C16 | 50 | | | | | | | | | |
| | | | Lauryl laurate | C11-C12 | 30 | | | | | | | | | 3.0 |
| | | | Cetyl caprate | C9-C16 | 30 | | | | | | | | | |
| | | | 2-Ethylhexyl palmitate | C15-C8 | — | | | | | | | | | |
| | | | EXCEPARL-SS (manufactured by Kao Corp.) | C17-C18 | 60 | | | | | | | | | |
| | | | Ketone compound/ester compound | | | (mass ratio) | 0.67/0.33 | 0.4/0.6 | 0.5/0.5 | 0.5/0.5 | 0.2/0.8 | 0.6/0.4 | 0.5/0.5 | 0.2/0.8 |
| | | | Total amount of gelling agents | | | (mass %) | 3.0 | 5.0 | 4.0 | 4.0 | 5.0 | 5.0 | 2.0 | 5.0 |
| | Actinic ray curable compound | | A-400 (Polyethylene glycol #400 diacrylate) | | | (mass %) | 32.0 | 30.0 | 31.0 | 31.0 | 30.0 | 30.0 | 33.0 | 30.0 |
| | | | SR494 (4EO-modified pentaerythritol tetraacrylate) | | | | 17.0 | 17.0 | 17.0 | 17.0 | 17.0 | 17.0 | 17.0 | 17.0 |
| | | | SR499 (6EO-modified trimethylolpropane triacrylate) | | | | 17.9 | 17.9 | 17.9 | 17.9 | 17.9 | 17.9 | 17.9 | 17.9 |
| | Polymerization inhibitor | | Irgastab UV10 | | | (mass %) | 0.1 | 0.1 | 0.1 | 0.1 | 0.1 | 0.1 | 0.1 | 0.1 |
| | Photopolymerization initiator | | TPO | | | (mass %) | 6.0 | 6.0 | 6.0 | 6.0 | 6.0 | 6.0 | 6.0 | 6.0 |
| | Photopolymerization initiator aid | | ITX (Isopropylthioxanthone) | | | (mass %) | 2.0 | 2.0 | 2.0 | 2.0 | 2.0 | 2.0 | 2.0 | 2.0 |
| | | | EDB (amine aid) | | | (mass %) | 3.0 | 3.0 | 3.0 | 3.0 | 3.0 | 3.0 | 3.0 | 3.0 |
| | Pigment dispersion liquid | | Pigment dispersion liquid 1 | | | (mass %) | 19.0 | 19.0 | 19.0 | 19.0 | 19.0 | 19.0 | 19.0 | 19.0 |
| | | | Total | | | (mass %) | 100.0 | 100.0 | 100.0 | 100.0 | 100.0 | 100.0 | 100.0 | 100.0 |
| | Ink properties | | 80° C. viscosity | | | (mPa · s) | 10 | 11 | 10 | 11 | 11 | 11 | 11 | 11 |
| | | | 25° C. viscosity | | | (mPa · s) | $1.8 \times 10^{-3}$ | $1.5 \times 10^{-4}$ | $1.5 \times 10^{-4}$ | $1.7 \times 10^{-4}$ | $1.0 \times 10^{-3}$ | $2.6 \times 10^{-4}$ | $1.2 \times 10^{-3}$ | $7.0 \times 10^{-2}$ |
| | | | Gelling temperature | | | (° C.) | 70 | 63 | 60 | 64 | 55 | 64 | 66 | 45 |
| Evaluation | Image evaluation | | Character quality | | | | A | A | A | A | A | A | A | B |
| | | | Density unevenness | | | | A | A | A | A | A | A | A | A |
| | | | Scratch resistance | | | | A | A | A | A | A | A | A | A |
| | | | Ejection stability | | | | A | A | A | A | A | A | A | A |

TABLE 2

| Ink composition | | Compound name | Number of carbon atoms | Melting point (° C.) | | Ex. 9 | Ex. 10 | Ex. 11 | Ex. 12 | Ex. 13 | Ex. 14 | Ex. 15 | Ex. 16 |
|---|---|---|---|---|---|---|---|---|---|---|---|---|---|
| Gelling agent | Ketone wax | 22-Tritetracontanone | C21-C21 | 88 | (mass %) | | | | | | | | |
| | | 18-Pentatriacontanone | C17-C17 | 84 | | | | | | | | 0.4 | 3.0 |
| | | 16-Hentriacontanone | C15-C15 | 80 | | | | | | | 3.0 | | |
| | | 12-Tricosanone | C11-C11 | 68 | | 1.0 | 1.0 | | | | | | |
| | Ester wax | Behenyl behenate | C21-C22 | 70 | (mass %) | | | 3.0 | | | | | |
| | | Stearyl stearate | C17-C18 | 60 | | | | 1.0 | 1.0 | | | | |
| | | Cetyl palmitate | C15-C16 | 54 | | | 5.0 | | | 0.5 | | | |
| | | Myristyl myristate | C13-C14 | 43 | | | | | | 0.2 | | | 0.2 |
| | | Cetyl myristate | C13-C16 | 50 | | | | | | | 5.0 | 5.0 | |
| | | Lauryl laurate | C11-C12 | 30 | | | | | | | | | |
| | | Cetyl caprate | C9-C16 | 30 | | 5.0 | | | | | | | |
| | | 2-Ethylhexyl palmitate | C15-C8 | — | | | | | 6.0 | | | | |
| | | EXCEPARL-SS (manufactured by Kao Corp.) | C17-C18 | 60 | | | | | | | | | |
| | | Ketone compound/ester compound | | | (mass ratio) | 0.17/0.83 | 0.17/0.83 | 0.75/0.25 | 0.14/0.86 | 0.71/0.29 | 0.38/0.63 | 0.07/0.93 | 0.94/0.06 |
| | | Total amount of gelling agents | | | (mass %) | 6.0 | 6.0 | 4.0 | 7.0 | 0.7 | 8.0 | 5.4 | 3.2 |
| Actinic ray curable compound | | A-400 (Polyethylene glycol #400 diacrylate) | | | (mass %) | 29.0 | 29.0 | 31.0 | 28.0 | 34.3 | 27.0 | 29.6 | 31.8 |
| | | SR494 (4EO-modified pentaerythritol tetraacrylate) | | | | 17.0 | 17.0 | 17.0 | 17.0 | 17.0 | 17.0 | 17.0 | 17.0 |
| | | SR499 (6EO-modified trimethylolpropane triacrylate) | | | | 17.9 | 17.9 | 17.9 | 17.9 | 17.9 | 17.9 | 17.9 | 17.9 |
| Polymerization inhibitor | | Irgastab UV10 | | | (mass %) | 0.1 | 0.1 | 0.1 | 0.1 | 0.1 | 0.1 | 0.1 | 0.1 |
| Photopolymerization initiator | | TPO | | | (mass %) | 6.0 | 6.0 | 6.0 | 6.0 | 6.0 | 6.0 | 6.0 | 6.0 |
| Photopolymerization initiator aid | | ITX (Isopropylthioxanthone) | | | (mass %) | 2.0 | 2.0 | 2.0 | 2.0 | 2.0 | 2.0 | 2.0 | 2.0 |
| | | EDB (amine aid) | | | (mass %) | 3.0 | 3.0 | 3.0 | 3.0 | 3.0 | 3.0 | 3.0 | 3.0 |
| Pigment dispersion liquid | | Pigment dispersion liquid 1 | | | (mass %) | 19.0 | 19.0 | 19.0 | 19.0 | 19.0 | 19.0 | 19.0 | 19.0 |
| Ink properties | | Total | | | (mass %) | 100.0 | 100.0 | 100.0 | 100.0 | 100.0 | 100.0 | 100.0 | 100.0 |
| | | 80° C. viscosity | | | (mPa · s) | 11 | 11 | 11 | 11 | 10 | 13 | 12 | 11 |
| | | 25° C. viscosity | | | (mPa · s) | 2.1 × 10⁻⁴ | 6.0 × 10⁻² | 5.0 × 10⁻² | 1.2 × 10⁻³ | 3.0 × 10⁻² | 4.0 × 10⁻⁴ | 3.0 × 10⁻³ | 2.5 × 10⁻³ |
| | | Gelling temperature | | | (° C.) | 53 | 40 | 50 | 35 | 45 | 67 | 46 | 64 |
| Evaluation | Image evaluation | Character quality | | | | A | B | B | B | B | A | B | B |
| | | Density unevenness | | | | A | A | B | B | B | A | A | A |
| | | Scratch resistance | | | | A | A | A | A | A | B | B | B |
| | | Ejection stability | | | | B | B | A | A | A | B | B | B |

TABLE 3

| Ink composition | | Compound name | Number of carbon atoms | Melting point (° C.) | | Comparative Example 1 | Comparative Example 2 | Comparative Example 3 | Comparative Example 4 | Comparative Example 5 |
|---|---|---|---|---|---|---|---|---|---|---|
| Gelling agent | Ketone wax | 22-Tritetracontanone | C21-C21 | 88 | (mass %) | | | | | |
| | | 18-Pentatriacontanone | C17-C17 | 84 | | | | | | |
| | | 16-Hentriacontanone | C15-C15 | 80 | | | | | | |
| | | 12-Tricosanone | C11-C11 | 68 | | 1.0 | | | | 1.0 |
| | Ester wax | Behenyl behenate | C21-C22 | 70 | (mass %) | | | | | |
| | | Stearyl stearate | C17-C18 | 60 | | | | | | |
| | | Cetyl palmitate | C15-C16 | 54 | | | | | | |
| | | Myristyl myristate | C13-C14 | 43 | | | | | | |
| | | Cetyl myristate | C13-C16 | 50 | | | 3.0 | 5.0 | | |
| | | Lauryl laurate | C11-C12 | 30 | | | | | | |
| | | Cetyl caprate | C9-C16 | 30 | | | | | 5.0 | |
| | | 2-Ethylhexyl palmitate | C15-C8 | — | | | | | | |
| | | EXCEPARL-SS (manufactured by Kao Corp.) | C17-C18 | 60 | | | | | | 5.0 |
| | | Ketone compound/ester compound | | | (mass ratio) | 1/0 | 1/0 | 1/0 | 0/1 | 0.17/0.83 |
| | | Total amount of gelling agents | | | (mass %) | 1.0 | 3.0 | 5.0 | 5.0 | 6.0 |
| Actinic ray curable compound | | A-400 (Polyethylene glycol #400 diacrylate) | | | (mass %) | 34.0 | 32.0 | 30.0 | 30.0 | 29.0 |
| | | SR494 (4EO-modified pentaerythritol tetraacrylate) | | | | 17.0 | 17.0 | 17.0 | 17.0 | 17.0 |
| Polymerization inhibitor | | Irgastab UV10 | | | (mass %) | 17.9 | 17.9 | 17.9 | 17.9 | 17.9 |
| Photopolymerization initiator | | TPO | | | (mass %) | 0.1 | 0.1 | 0.1 | 0.1 | 0.1 |
| Photopolymerization initiator aid | | ITX (Isopropylthioxanthone) | | | | 6.0 | 6.0 | 6.0 | 6.0 | 6.0 |
| | | EDB (amine aid) | | | (mass %) | 2.0 | 2.0 | 2.0 | 2.0 | 2.0 |
| Pigment dispersion liquid | | Pigment dispersion liquid 1 | | | (mass %) | 3.0 | 3.0 | 3.0 | 3.0 | 3.0 |
| | | | | | | 19.0 | 19.0 | 19.0 | 19.0 | 19.0 |
| | | Total | | | (mass %) | 100.0 | 100.0 | 100.0 | 100.0 | 100.0 |
| Evaluation | Ink properties | 80° C. viscosity | | | (mPa · s) | 10 | 11 | 11 | 13 | 11 |
| | | 25° C. viscosity | | | (mPa · s) | $1.5 \times 10^{-2}$ | $2.0 \times 10^{3}$ | $3.0 \times 10^{3}$ | $2.8 \times 10^{3}$ | $7.0 \times 10^{1}$ |
| | | Gelling temperature | | | (° C.) | 59 | 65 | 69 | 42 | 25 |
| | Image evaluation | Character quality | | | | C | B | A | C | C |
| | | Density unevenness | | | | C | A | A | A | C |
| | | Scratch resistance | | | | A | B | B | B | C |
| | | Ejection stability | | | | A | C | C | B | A |

TABLE 4

| | | | Compound name | Number of carbon atoms | Melting point (° C.) | | | Example 17 | Example 18 | Example 19 |
|---|---|---|---|---|---|---|---|---|---|---|
| Ink composition | Gelling agent | Ketone wax | Distearyl ketone | C17-C17 | 87.5 | (mass %) | | 2.0 | 2.0 | 2.0 |
| | | Ester wax | Myricyl cerotate | C25-C16 | 80 | (mass %) | | 1.0 | | |
| | | | Behenyl montanate | C27-C22 | 80 | | | | 0.5 | |
| | | | Behenyl oleate | C18-C22 | 40 | | | | | 0.3 |
| | | | Ketone compound/ester compound | | | (mass ratio) | | 0.67/0.33 | 0.8/0.2 | 0.4/0.6 |
| | | | Total amount of gelling agents | | | (mass %) | | 3.0 | 2.5 | 5.0 |
| | Actinic ray durable compound | | A-400 (Polyethylene glycol #400 diacrylate) | | | (mass %) | | 32.0 | 32.5 | 30.0 |
| | | | SR-494 (4EO-modified pentaerythritol tetraacrylate) | | | | | 17.0 | 17.0 | 17.0 |
| | | | SR499 (6EO-modified trimethylolpropane triacrylate) | | | | | 17.9 | 17.9 | 17.9 |
| | Polymerization inhibitor | | Irgastab UV10 | | | (mass %) | | 0.1 | 0.1 | 0.1 |
| | Photopolymerization | | TPO | | | (mass %) | | 6.0 | 6.0 | 6.0 |
| | Photopolymerization inhibitor aid | | ITX (isopropylthioxanthane) | | | (mass %) | | 2.0 | 2.0 | 2.0 |
| | | | EDB (amine aid) | | | | | 3.0 | 3.0 | 3.0 |
| | Pigment dispersion liquid | | Pigment dispersion liquid 1 | | | (mass %) | | 19.0 | 19.0 | 19.0 |
| | | | Total | | | (mass %) | | 100.0 | 100.0 | 100.0 |
| Evaluation | Ink properties | | 80° C. viscosity | | | (mPa · s) | | 10 | 10 | 10 |
| | | | 25° C. viscosity | | | (mPa · s) | | $1.5 \times 10^3$ | $2.0 \times 10^3$ | $1.2 \times 10^3$ |
| | | | Gelling temperature | | | (° C.) | | 67 | 69 | 60 |
| | Image evaluation | | Character quality | | | | | B | B | B |
| | | | Density unevenness | | | | | A | A | B |
| | | | Rub resistance | | | | | A | A | A |
| | | | Ejection stability | | | | | B | B | A |

As seen from Tables 1 to 2 and 4, the inks of Examples 1 to 19 containing a particular ketone wax (for example, compound A represented by General Formula 1) and a particular ester wax (for example, compound B represented by General Formula 2) as gelling agents can achieve a good balance between high character quality and high ejection stability. By contrast, it can be seen from Table 3 that the ink of Comparative Example 1 fails to enhance character quality due to a smaller amount of ketone compound. Furthermore, it can be seen that the inks of Comparative Examples 2 and 3 exhibit relatively high character quality, but ejection stability is low. Also, it can be seen that the ink of Comparative Example 4 containing only an ester compound as the gelling agent exhibits relatively high ejection stability but low character quality.

Furthermore, it can be seen that although the ink of Comparative Example 5 contains a ketone compound and an ester compound as the gelling agents, since the character quality is low, so too is pinning property. This is considered to be due to the fact that the number of carbon atoms in the alkylene group of the ester compound contained in the ink of Comparative Example 5 is lower than 9 and therefore the compound exhibits excessively low crystallizability.

2. Evaluation of Color Images

Example 17

1) Preparation of pigment dispersions 2 to 4

In addition to pigment dispersion liquid 1 (M: magenta) prepared in Example 1, the following pigment dispersion liquids 2 to 4 were further prepared.

Preparation of Pigment Dispersion Liquid 2 (K: Black)

Pigment dispersion liquid 2 was prepared in the same manner as in the preparation method for pigment dispersion liquid 1 of Example 1, except that 21 parts by mass of Pigment Black 7 (manufactured by Mitsubishi Chemical Corp., #52) was added instead of magenta pigment 1, the solution was introduced into a glass bottle together with 200 g of zirconia beads having a diameter of 0.5 mm, the glass bottle was tightly sealed, and the mixture was subjected to a dispersion treatment for 5 hours in a paint shaker.

Preparation of Pigment Dispersion Liquid 3 (C: Cyan)

Pigment dispersion liquid 3 was prepared in the same manner as in the preparation method for pigment dispersion liquid 1 of Example 1, except that 21 parts by mass of Pigment Blue 15:4 (manufactured by Dainichiseika Color & Chemicals Manufacturing Co., Ltd., CHROMOFINE BLUE 6332JC) was added instead of magenta pigment 1, the solution was introduced into a glass bottle together with 200 g of zirconia beads having a diameter of 0.5 mm, the glass bottle was tightly sealed, and the mixture was subjected to a dispersion treatment for 5 hours in a paint shaker.

Preparation of Pigment Dispersion Liquid 4 (Y: Yellow)

Pigment dispersion liquid 4 was prepared in the same manner as in the preparation method for pigment dispersion liquid 1 of Example 1, except that 21 parts by mass of Pigment Yellow 150 (manufactured by Lanxess AG, E4GN-GT CH20015) was added instead of magenta pigment 1, the solution was introduced into a glass bottle together with 200 g of zirconia beads having a diameter of 0.5 mm, the glass bottle was tightly sealed, and the mixture was subjected to a dispersion treatment for 8 hours in a paint shaker.

2) Preparation of Ink

Pigment dispersion liquid 1, 2, 3 or 4 and the compounds described below were mixed, and the mixture was heated to 80° C. and stirred. The solution thus obtained was filtered through a #3000 metal mesh filter under heating, and then was cooled. Thus, inks of four colors (M: magenta, K: black, C: cyan, Y: yellow) were prepared.

[Composition of Ink]

Actinic Ray Curable Compound:

A-400 (polyethylene glycol #400 diacrylate, manufactured by Shin Nakamura Chemical Co., Ltd.) 30.0 parts by mass;

SR494 (4EO-modified pentaerythritol tetraacrylate, manufactured by Sartomer Company, Inc.) 17.0 parts by mass; and SR499 (6EO-modified trimethylolpropane triacrylate, manufactured by Sartomer Company, Inc.) 17.9 parts by mass
Compound A Represented by General Formula 1:
  18-Pentatriacontanone 1.5 parts by mass; and
  16-Hentriacontanone 0.5 parts by mass
Compound B Represented by General Formula 2:
  Stearyl stearate 2.0 parts by mass; and
  Cetyl palmitate 1.0 part by mass
Polymerization Inhibitor:
  IRGASTAB UV10 (manufactured by Ciba Japan K.K.) 0.1 parts by mass
Photopolymerization Initiator:
  TPO (phosphine oxide, DAROCURE TPO, manufactured by Ciba Japan K.K.) 6.0 parts by mass
Photopolymerization Initiator Aid:
  ITX (isopropylthioxanthone, SPEEDCURE ITX manufactured by Lambson, Ltd. 2.0 parts by mass; and
  EDB (amine aid SPEED CURE EDB manufactured by Lambson, Ltd.) 3.0 parts by mass
Pigment Dispersion Liquid 1, 2, 3 or 4: 19.0 Parts by Mass Comparative Examples 6 and 7

Inks of four colors (M: magenta, K: black, C: cyan, Y: yellow) were prepared in the same manner as in Example 17, except that the four color inks (M: magenta, K: black, C: cyan, Y: yellow) were prepared that have the compositions shown in Table 5.

The properties (viscosities at 25° C. and 80° C., and gelling temperature) of the respective color inks obtained in Examples and Comparative Examples were measured in the same manner as described above. Furthermore, color images were formed using the four color inks obtained in Examples and Comparative Examples.

Image Forming Method (Method for Forming Color Images)

Color images were formed using the line inkjet printing apparatus. Specifically, the four color inks (Y, M, C and K) thus obtained were loaded into the respective inkjet heads of the inkjet printing apparatus, and the inks were heated to 80° C. As the recording media, printing coated paper A (OK TOPCOAT, basis weight: 128 g/m$^2$, manufactured by Oji Paper Co., Ltd.), printing coated paper B (NEW AGE, basis weight: 105 g/m$^2$, manufactured by Oji Paper Co., Ltd.), and a polyethylene terephthalate film (white PET, manufactured by Maruu Co., Ltd.) were provided.

Ink droplets were discharged onto each of the recording media under the same conditions as in the image forming method described above, and thereby an image of "bicycle" of JIS/SCID N5 was formed in the A4 size. Thereafter, the ink was cured by irradiating ultraviolet radiation using an LED lamp (water-cooled LED at 395 nm manufactured by Phoseon Technology, Inc.) that was disposed on the downstream side of the inkjet printing apparatus, and thus an image was formed.

1) Image quality of the characters, 2) density unevenness, 3) rub resistance, and 4) ink ejection stability upon image formation were evaluated in the same manner as described above. The results are presented in Table 5.

Examples 18 and 19

Color images were formed in the same manner as in Example 17, except that the ink temperature inside the inkjet head upon color image formation was modified as shown in Table 5. 1) Image quality of the characters, 2) density unevenness, 3) rub resistance, and 4) ink ejection stability were then evaluated. The results are presented in Table 5.

TABLE 5

| | Ink set | | | Examples 17 to 19 C | | | | Comparative Example 6 A | | | | Comparative Example 7 B | | | |
|---|---|---|---|---|---|---|---|---|---|---|---|---|---|---|---|
| | | Color | | Black | Cyan | Yellow | Magenta | Black | Cyan | Yellow | Magenta | Black | Cyan | Yellow | Magenta |
| Ink composition | Gelling agent | Ketone compound | 18-Pentatriacontanone | 1.5 | 1.5 | 1.5 | 1.5 | | | | | | | | |
| | | | 16-Hentriacontanone | 0.5 | 0.5 | 0.5 | 0.5 | | | | | | | | |
| | | Ester compound | Stearyl stearate | 2.0 | 2.0 | 2.0 | 2.0 | | | | | | | | |
| | | | Cetyl palmitate | 1.0 | 1.0 | 1.0 | 1.0 | | | | | | | | |
| | | Ketone compound/ester compound (mass ratio) | | 0.4/0.6 | 0.4/0.6 | 0.4/0.6 | 0.4/0.6 | | | | | | | | |
| | | Total amount of gelling agents (mass %) | | 5.0 | 5.0 | 5.0 | 5.0 | | | | | | | | |
| | Actinic ray curable compound | A-400 | | 30.0 | 30.0 | 30.0 | 30.0 | 35.0 | 35.0 | 35.0 | 35.0 | | | | |
| | | SR494 | | 17.0 | 17.0 | 17.0 | 17.0 | 17.9 | 17.9 | 17.9 | 17.9 | 1/0 | 1/0 | 1/0 | 1/0 |
| | | SR499 | | 17.9 | 17.9 | 17.9 | 17.9 | 17.9 | 17.9 | 17.9 | 17.9 | 1.0 | 1.0 | 1.0 | 1.0 |
| | | | | | | | | | | | | 29.0 | 29.0 | 29.0 | 29.0 |
| | | | | | | | | | | | | 17.9 | 17.9 | 17.9 | 17.9 |
| | | | | | | | | | | | | 17.9 | 17.9 | 17.9 | 17.9 |
| | Polymerization inhibitor | Irgastab UV10 | (mass %) | 0.1 | 0.1 | 0.1 | 0.1 | 0.1 | 0.1 | 0.1 | 0.1 | 0.1 | 0.1 | 0.1 | 0.1 |
| | Photopolymerization initiator | TPO | (mass %) | 6.0 | 6.0 | 6.0 | 6.0 | 6.0 | 6.0 | 6.0 | 6.0 | 6.0 | 6.0 | 6.0 | 6.0 |
| | Photopolymerization initiator aid | ITX | (mass %) | 2.0 | 2.0 | 2.0 | 2.0 | 2.0 | 2.0 | 2.0 | 2.0 | 2.0 | 2.0 | 2.0 | 2.0 |
| | | EDB | (mass %) | 3.0 | 3.0 | 3.0 | 3.0 | 3.0 | 3.0 | 3.0 | 3.0 | 3.0 | 3.0 | 3.0 | 3.0 |
| | Pigment dispersion liquid | Pigment dispersion liquid 2 | (mass %) | 19.0 | | | | 19.0 | | | | 19.0 | | | |
| | | Pigment dispersion liquid 3 | | | 19.0 | | | | 19.0 | | | | 19.0 | | |
| | | Pigment dispersion liquid 4 | | | | 19.0 | | | | 19.0 | | | | 19.0 | |
| | | Pigment dispersion liquid 1 | | | | | 19.0 | | | | 19.0 | | | | 19.0 |
| | total | | (mass %) | 100.0 | 100.0 | 100.0 | 100.0 | 100.0 | 100.0 | 100.0 | 100.0 | 95.0 | 95.0 | 95.0 | 95.0 |
| Evaluation | Ink properties | 80° C. viscosity | (mPa·s) | 11 | 11 | 11 | 11 | — | — | — | — | 10 | 10 | 10 | 10 |
| | | 25° C. viscosity | (mPa·s) | $1.5 \times 10^4$ | $1.8 \times 10^4$ | $1.5 \times 10^4$ | $1.6 \times 10^4$ | — | — | — | — | $1.5 \times 10^{-2}$ | $2.0 \times 10^{-2}$ | $1.5 \times 10^{-2}$ | $1.8 \times 10^{-2}$ |
| | | Gelling temperature | (° C.) | 64 | 64 | 63 | 63 | — | — | — | — | 60 | 60 | 59 | 60 |
| | Image evaluation | Density unevenness | Printing coated paper A | A | A | A | A | C | C | C | C | A | A | A | A |
| | | | Printing coated paper B | A | A | A | A | C | C | C | C | A | A | A | A |
| | | | PET film | A | A | A | A | C | C | C | C | A | A | A | A |
| | | Scratch resistance | Printing coated paper A | A | A | A | A | C | C | C | C | A | A | A | A |
| | | | Printing coated paper B | A | A | A | A | C | C | C | C | A | A | A | A |
| | | | PET film | B | B | B | B | C | C | C | C | B | B | B | B |
| | | Ejection stability | 72° C. ejection | A | A | A | A | — | — | — | — | — | — | — | — |
| | | | 80° C. ejection | A | A | A | A | A | A | A | A | C | C | C | C |
| | | | 100° C. ejection | B | B | B | B | — | — | — | — | — | — | — | — |

As shown in Table 5, it can be seen that since the ink set of Example 17 containing a particular ketone compound (compound A represented by General Formula 1) and a particular ester compound (compound B represented by General Formula 2) as the gelling agents exhibits less density unevenness and high rub resistance, the ink set exhibits high image quality and high ejection stability. By contrast, it can be seen that the ink set of Comparative Example 6 that does not contain the gelling agent exhibit high ejection stability, but exhibits low image quality. Furthermore, it can be seen that the ink set of Comparative Example 7 containing only a ketone compound as the gelling agent exhibits relatively high character quality, but exhibits low ejection stability.

Furthermore, even for an ink set (four color inks) that is the same as that of Example 17, it can be seen that the ink set exhibits relatively satisfactory ejection stability, irrespective of the case where the ejection temperature is lowered to 72° C. (Example 18), or the case where the ejection temperature is raised to 100° C. (Example 19).

INDUSTRIAL APPLICABILITY

According to the present invention, an actinic ray curable inkjet ink which can achieve a balance between high pinning property and high ejectability can be provided.

REFERENCE SIGNS LIST 10, 20 Inkjet printing apparatus
12 Recording medium
14, 24 Inkjet head
16, 26 Head carriage
18, 28 Actinic ray irradiation section
19 Temperature control section
27 Guide section

The invention claimed is:

1. An actinic ray curable inkjet ink comprising an actinic ray curable compound, a ketone wax, and an ester wax,
   wherein the ink undergoes reversible sol-gel phase transition depending on temperature, and
   wherein the total amount of the ketone wax and the ester wax is less than 10% by mass with respect to the mass of the actinic ray curable inkjet ink.

2. The actinic ray curable inkjet ink according to claim 1, wherein a melting point of the ketone wax is higher than a melting point of the ester wax.

3. The actinic ray curable inkjet ink according to claim 1, wherein a difference between the melting point of the ketone wax and the melting point of the ester wax is 10° C. or more.

4. The actinic ray curable inkjet ink according to claim 1, wherein the number of carbon atoms in a molecule that constitute the ketone wax and the number of carbon atoms in a molecule that constitute the ester wax are each 19 to less than 100.

5. The actinic ray curable inkjet ink according to claim 1, wherein the melting points of the ketone wax and the ester wax are each 30° C. to lower than 150° C.

6. The actinic ray curable inkjet ink according to claim 1, wherein the ketone wax is a compound A represented by the following General Formula 1:

where R1 and R2 each independently represent an aliphatic hydrocarbon group containing a straight chain moiety having 9 to 25 carbon atoms; and the ester wax is a compound B represented by General Formula 2:

where R3 and R4 each independently represent an aliphatic hydrocarbon group containing a straight chain moiety having 9 to 26 carbon atoms.

7. The actinic ray curable inkjet ink according to claim 1, wherein a total amount of the ketone wax and the ester wax is 0.5% by mass to less than 10% by mass with respect to the actinic ray curable inkjet ink.

8. The actinic ray curable inkjet ink according to claim 1, wherein a total amount of the ketone wax and the ester wax is 1% by mass to less than 7% by mass with respect to the actinic ray curable inkjet ink.

9. The actinic ray curable inkjet ink according to claim 1, wherein the actinic ray curable compound is a (meth)acrylate compound.

10. The actinic ray curable inkjet ink according to claim 9, wherein the (meth)acrylate compound is an ethylene oxide-modified (meth)acrylate compound.

11. The actinic ray curable inkjet ink according to claim 6, wherein in General Formula 1,
    R1 and R2 each represent an aliphatic hydrocarbon group containing a straight chain moiety having 11 to less than 23 carbon atoms.

12. The actinic ray curable inkjet ink according to claim 6, wherein in General Formula 1,
    R1 and R2 each represent a linear alkylene group 11 to less than 23 carbon atoms.

13. The actinic ray curable inkjet ink according to claim 6, wherein in General Formula 2,
    R3 represents an aliphatic hydrocarbon group containing a straight chain moiety having 11 to less than 23 carbon atoms, and
    R4 represents an aliphatic hydrocarbon group containing a straight chain moiety having 12 to less than 24 carbon atoms.

14. The actinic ray curable inkjet ink according to claim 6, wherein in General Formula 2,
    R3 represents a linear alkylene group having 11 to less than 23 carbon atoms, and
    R4 represents a linear alkylene group having 12 to less than 24 carbon atoms.

15. The actinic ray curable inkjet ink according to claim 1, wherein the ketone wax comprises 18-pentatriacontanone.

16. The actinic ray curable inkjet ink according to claim 1, wherein the ink comprises two or more kinds of the ketone wax.

17. The actinic ray curable inkjet ink according to claim 1, wherein a viscosity of the ink as measured using a cone-plate type rheometer having a diameter of 75 mm and a cone angle of 1.0° at 80° C. and a shear rate of 11.7/s is 3 mPa·s to 20 mPa·s.

18. The actinic ray curable inkjet ink according to claim 1, wherein a viscosity of the ink as measured using a cone-plate type rheometer having a diameter of 75 mm and a cone angle of 1.0° at 25° C. and a shear rate of 11.7/s is 1,000 mPa·s or greater.

19. The actinic ray curable inkjet ink according to claim 1, wherein a gelling temperature of the ink is 40° C. to 70° C., the gelling temperature being a temperature at which a viscosity of the ink reaches 200 mPa·s when a temperature of the ink is lowered from 100° C. to 20° C. at a temperature decline rate of 0.1° C./s, the viscosity being measured at a shear rate of 11.7/s using a cone-plate type rheometer having a diameter of 75 mm and a cone angle of 1.0°.

20. An image recording method comprising:

discharging droplets of the actinic ray curable inkjet ink according to claim 1 from a inkjet head, allowing the droplets to adhere onto a recording medium; and irradiating the droplets adhered onto the recording medium with an actinic ray to cure the ink.

21. The image recording method according to claim 20, wherein a temperature of the ink inside the inkjet head is 10° C. to 30° C. higher than a gelling temperature of the ink, the gelling temperature being a temperature at which a viscosity of the ink reaches 200 mPa·s when a temperature of the ink is lowered from 100° C. to 20° C. at a temperature decline rate of 0.1° C./s, the viscosity being measured at a shear rate of 11.7/s using a cone-plate type rheometer having a diameter of 75 mm and a cone angle of 1.0°.

22. The image recording method according to claim 20, wherein an image is recorded by means of single-pass printing.

23. The actinic ray curable inkjet ink according to claim 1, wherein the ketone wax and the ester wax crystallize in the ink when temperature of the ink is lower than or equal to the gelling temperature of the ink.

24. The actinic ray curable inkjet ink according to claim 1, wherein the ketone wax and the ester wax form a card-house structure.

25. The actinic ray curable inkjet ink according to claim 1, wherein the ketone wax and the ester wax are dissolved in the actinic ray curable compound when temperature of the ink is higher than the gelling temperature of the ink.

* * * * *